(12) United States Patent
Yamada et al.

(10) Patent No.: US 8,884,489 B2
(45) Date of Patent: Nov. 11, 2014

(54) MOTOR

(75) Inventors: Takashi Yamada, Toyota (JP); Atsushi Watanabe, Toyota (JP); Manabu Kitamura, Miyoshi (JP); Shingo Hashimoto, Okazaki (JP); Yoshiyuki Kawasaki, Takahama (JP)

(73) Assignees: Toyota Jidosha Kabushiki Kaisha, Toyota-Shi (JP); Aisin AW Co., Ltd., Anjo-Shi (JP)

( * ) Notice: Subject to any disclaimer, the term of this patent is extended or adjusted under 35 U.S.C. 154(b) by 414 days.

(21) Appl. No.: 13/499,665

(22) PCT Filed: Sep. 6, 2010

(86) PCT No.: PCT/JP2010/065215
§ 371 (c)(1),
(2), (4) Date: Mar. 30, 2012

(87) PCT Pub. No.: WO2011/155083
PCT Pub. Date: Dec. 15, 2011

(65) Prior Publication Data
US 2012/0181891 A1    Jul. 19, 2012

(30) Foreign Application Priority Data

Jun. 10, 2010    (JP) ................................ 2010-133067

(51) Int. Cl.
| | |
|---|---|
| H02K 3/04 | (2006.01) |
| H02K 3/28 | (2006.01) |
| H02K 3/12 | (2006.01) |
| H02K 15/06 | (2006.01) |
| H02K 15/04 | (2006.01) |

(52) U.S. Cl.
CPC ............... *H02K 15/045* (2013.01); *H02K 3/12* (2013.01); *H02K 15/066* (2013.01)
USPC ............................ 310/208; 310/179; 310/201

(58) Field of Classification Search
CPC ....... H02K 17/14; H02K 19/14; H02K 19/32; H02K 17/06; H02K 3/48; H02K 3/14; H02K 3/18; H02K 3/12; H02K 3/28
USPC .......................................... 310/179, 208, 207
See application file for complete search history.

(56) References Cited

U.S. PATENT DOCUMENTS

| | | | |
|---|---|---|---|
| 2007/0170810 A1* | 7/2007 | Hirzel | 310/268 |
| 2010/0102681 A1* | 4/2010 | Koga et al. | 310/68 B |
| 2010/0187938 A1* | 7/2010 | Yamamoto et al. | 310/195 |
| 2010/0289374 A1* | 11/2010 | Koga et al. | 310/195 |
| 2012/0217836 A1* | 8/2012 | Watanabe et al. | 310/207 |

FOREIGN PATENT DOCUMENTS

| | | |
|---|---|---|
| JP | 04-289744 A | 10/1992 |
| JP | 2002-051489 A | 2/2002 |

(Continued)

OTHER PUBLICATIONS

International Search Report of PCT/JP2010/065215 mailed Dec. 14, 2010.

*Primary Examiner* — Terrance Kenerly
(74) *Attorney, Agent, or Firm* — Kenyon & Kenyon LLP

(57) ABSTRACT

A flat conductor wire in a U-phase first slot of a first group block and a flat conductor wire in a U-phase second slot of a second group block form an outer circumference base unit. A flat conductor wire in a U-phase second slot of the first group block and a flat conductor wire in the U-phase first slot of the second group block form an inner circumference base unit. The inner circumference base unit is located inside the outer circumference base unit. A coil end portion at one end of the inner circumference base unit and a coil end portion side at one end of the outer circumference base unit are bent toward the rotor side with respect to an in-slot conductor portion in the stator core. The coil end portion side at one end of the inner circumference base unit and the coil end portion side at one end of the outer circumference base unit are located further toward the axis of the rotor than an inner peripheral surface of the stator core.

8 Claims, 31 Drawing Sheets

(56) References Cited

FOREIGN PATENT DOCUMENTS

| JP | 2008-167567 A | 7/2008 |
| WO | 92/01327 A1 | 1/1992 |
| WO | 2010/007950 A1 | 1/2010 |
| WO | 2011/055438 A1 | 5/2011 |

* cited by examiner

MOTOR

CROSS-REFERENCE TO RELATED APPLICATIONS

This is a 371 national phase application of PCT/JP2010/065215 filed on 6 Sep. 2010, which claims priority to Japanese Patent Application No. 2010-133067 filed 10 Jun. 2010, the entire contents of which are incorporated herein by reference.

FIELD OF THE INVENTION

The present invention relates to a motor including a stator having a distributed winding coil made of a flat rectangular conductor wire and a stator core, and a rotor having a center shaft.

BACKGROUND OF THE INVENTION

It is conventionally difficult to insert and assemble for example a distributed winding coil made of a flat conductor wire having a rectangular cross-section of about 1 mm×about 10 mm into a slot of a stator core because the flat conductor wire is stronger in rigidity than a round wire and hence not easy to deform. Various countermeasures thereto have been proposed.

Patent Document 1 proposes that the width of a conductor wire and the inclination angle of a coil formed of a wound conductor wire are determined to facilitate insertion of the coil in slots formed around a tooth from inside to outside in a radial direction.

Patent Document 2 proposes a method whereby a conductor wire is wound in an overlapping manner to form a coil to be inserted in slots, the coil is installed in an insertion jig, this jig is then put in a stator core, and the coil is inserted from the jig to the slots of the stator core.

Patent Document 3 discloses a distributed winding coil in which a leading end portion to be inserted is bent toward an axis side.

RELATED ART DOCUMENTS

Patent Documents

Patent Document 1: JP 2002-051489A
Patent Document 2: JP 2008-167567A
Patent Document 3: WO 92/01327

SUMMARY OF THE INVENTION

Problems to be Solved by the Invention

However, the conventional methods of inserting the coil in the stator core have the following problems.

Specifically, the method of inserting coils individually on teeth as in Patent Document 1 needs to repeat insertion in the number of times corresponding to the number of teeth. The insertion thus takes long. In addition, an insertion device is complicated and large in size.

In the case of using the insertion jig as in Patent Document 2, even though the coil elastically deformed in the insertion jig is inserted in the slots well, the coil is apt to become deformed due to spring back after inserted, causing a part of the wire to protrude out of the slots.

In both of the techniques of Patent Documents 1 and 2, the coil is inserted from inside to outside in the radial direction with respect to the teeth and slots. Thus, the aforementioned problems are caused. To solve the above problems, the present applicant came up with insertion of a coil in slots in an axial direction.

As to a concentrated winding coil, if its leading end portion to be first inserted is bent toward the axis side, the remaining portion is easy to insert in the slots. As to a distributed winding coil, however, the shape of bent portions is complicated and also the wires are originally difficult to bend.

A technique of bending the leading end portion of the distributed winding coil to be inserted is disclosed in Patent Document 3. In this technique, however, a plurality of conductors bent at different portions are separately manufactured and assembled together. Accordingly, a manufacture time is long and a cost is high.

The present invention has been made to solve the above problems and has a purpose to provide a low-cost motor in which a distributed winding coil made of a flat conductor wire is easily inserted in a slot in an axial direction.

Means of Solving the Problems

To achieve the above purpose, one aspect of the invention provides a motor configured as below.

(1) In a motor including: a stator including a distributed winding coil formed of a flat conductor wire and a stator core formed with slots between teeth; and a rotor having a central axis, (a) the slots are sequentially arranged by group blocks each including a U-phase first slot, a U-phase second slot, a V-phase first slot, a V-phase second slot, a W-phase first slot, and a W-phase second slot, a second group block being formed adjacent to a first group block, and (b) the flat conductor wire in a U-phase first slot of the first group block and the flat conductor wire in a U-phase second slot of the second group block form a first loop, (c) the flat conductor wire in a U-phase second slot of the first group block and the flat conductor wire in a U-phase first slot of the second group block form a second loop, (d) the second loop is placed inside the first loop, (e) a coil end portion at one end of the second loop and a coil end portion at one end of the first loop are bent toward the rotor side with respect to in-slot conductor portions in the stator core, and (f) the coil end portion at the one end of the second loop and the coil end portion at the one end of the first loop are located further toward the axis of the rotor than an inner peripheral surface of the stator core.

(2) In the motor in (1), preferably, the first loop and the second loop are each formed as a base unit including a predetermined number of flat conductor wires bent at the same time.

(3) In the motor in (2), preferably, on the coil end portion at the one end, the flat conductor wires of each base unit overlap in the axis direction of the rotor, and on the coil end portion at the other end, the flat conductor wires of each base unit overlap in the radial direction of the rotor.

(4) In one of the motors disclosed in (1) to (3), preferably, the coil end portion side at the one end of the second loop overlaps, outward in the radial direction of the rotor, on the coil end portion at the one end of the first loop, and the coil end portion at the other end of the second loop overlaps, inside in the axial direction of the rotor, on the coil end portion at the other end of the first loop.

(5) In the motor in (2) or (3), preferably, in portions of each base unit forming the coil end portion side at the one end, a radius of a curved portion which is a connecting portion with the in-slot conductor portion at one side is different by wires before the flat conductor wires are bent.

(6) In the motor in (2), (3), or (5), preferably, portions of each base unit forming the coil end portion at the one end are displaced before the flat conductor wires are bent, and the flat conductor wires of each base unit overlap one another at the same radial position when the flat conductor wires are bent.

Effect of the Invention

The operations and effects of the motor and the motor manufacturing method according to the present invention will be explained below.

(1) In a motor including: a stator including a distributed winding coil formed of a flat conductor wire and a stator core formed with slots between teeth; and a rotor having a central axis, (a) the slots are sequentially arranged by group blocks each including a U-phase first slot, a U-phase second slot, a V-phase first slot, a V-phase second slot, a W-phase first slot, and a W-phase second slot, a second group block being formed adjacent to a first group block, and (b) the flat conductor wire in a U-phase first slot of the first group block and the flat conductor wire in a U-phase second slot of the second group block form a first loop, (c) the flat conductor wire in a U-phase second slot of the first group block and the flat conductor wire in a U-phase first slot of the second group block form a second loop, (d) the second loop is placed inside the first loop, (e) a coil end portion at one end of the second loop and a coil end portion at one end of the first loop are bent toward the rotor side with respect to in-slot conductor portions in the stator core, and (f) the coil end portion at the one end of the second loop and the coil end portion at the one end of the first loop are located further toward the axis of the rotor than an inner peripheral surface of the stator core. Accordingly, when the coil is to be inserted along an axis with the coil end portion A at one end directed as a leading end into the slots of the stator, the coil end portion A at one end passes through a more inner side than the inner peripheral surface of the stator core. Thus, the coil is allowed to easily insert in the slots in the axial direction. Since the coil is not elastically deformed when it is inserted, the coil does not partly protrude out of the slots due to spring back.

The flat rectangular wires form a double coil including the first loop and the second loop. Accordingly, the lane change portion has a large space allowance.

In the case where a coil made of a flat conductor wire in a loop form is to be inserted in a stator core, the wires (i.e., wire portions) are arranged in planar form on an end face of the stator core. In this case, since the end face of the stator core has a restricted area, it is difficult to increase the number of wires to increase the number of turns of a coil. In the case of configuring the coil in a distributed winding form, the concentrically wound coils interfere with each other, and therefore the coil end portion needs a lane change portion. In the lane change portion, the coil width is apt to become an issue.

Therefore, the double coil structure according to the invention in which the second loop is located on the inner circumferential side of the first loop can three-dimensionally utilize the end face of the stator core. As a result, the number of turns of a coil can be increased. Even when the number of turns is increased, the adjacent coils can be prevented from interfering with each other at the lane change portions.

Since the double coil is formed by overlapping the first loop and the second loop, the stator core with deep slots can be adopted without so increasing the thickness of the coil end. This can achieve enhancement of the space factor of the stator and meet the requirement of reduction in size.

On the other hand, the lane change portions are necessary when a coil is concentrically wound and a stator is arranged in a distributed winding form. This is because if the concentrically wound coils are inserted by straddling or skipping two or more slots, an interference portion occurs between the adjacent coils and thus it is necessary to avoid such an interference portion.

To be concrete, assuming that a flat conductor wire to be inserted in a slot is referred to as an in-slot conductor portion, a first loop of a U-phase coil has one in-slot conductor portion inserted in a U-phase first slot of a first group and the other in-slot conductor portion inserted in a U-phase second slot of a second group. As an adjacent one thereto, a first loop of a V-phase coil is placed so that one in-slot conductor portion is inserted in a V-phase first slot of the first group and the other in-slot conductor portion is inserted in a V-phase second slot of the second group.

The first loop of the V-phase coil has to be arranged so that a portion inserted in the U-phase first slot of the first group is located under the first loop of the U-phase coil and a portion inserted in the second slot of the second group is located above the first loop of the U-phase coil.

To be more specific, the first and second loops are formed in a double structure. At one side, the U-phase first loop, the U-phase second loop, the V-phase first loop, and the V-phase second loop are positioned from above, while at the other side, the V-phase first loop, the V-phase second loop, the U-phase first loop, and the U-phase second loop are positioned from above.

If the flat conductor wires on the end face of the stator core are arranged in planar form, the necessary lane change portions could only use a space corresponding to one slot. In contrast, the double coil in the present invention can use a space corresponding to two slots, double the above, for each lane change portion. In view of the bending radius, the lane change portion is preferably designed to have as wide a width as possible.

Herein, the "two-slot region" represents the width corresponding to two slots and two teeth assuming that one slot and one tooth are referred to as one-slot region.

This is because increasing the cross sectional area of a flat conductor wire larger is effective in enhancing the space factor. As the cross sectional area is larger, the bending radius is also relatively larger. Consequently, the present invention can provide the stator with high space factor.

(2) In the motor in (1), the first loop and the second loop are each formed as a base unit including a predetermined number of flat conductor wires bent at the same time. Since the wires wound in overlapping form (a base unit) are bent at the same time, a manufacturing process thereof can be simplified and its cost can be reduced.

(3) In the motor (2), on the coil end portion at the one end, the flat conductor wires of each base unit overlap in the axis direction of the rotor, and on the coil end portion at the other end, the flat conductor wires of each base unit overlap in the radial direction of the rotor. On the coil end portion B side at the other end, accordingly, the wires of each base unit overlap in the radial direction of the rotor. This can reduce the axial size of the coil end. Simultaneously, on the coil end portion A side at one end, the wires overlap in the axial direction. This can reduce the radial size of the bent coil end.

(4) In one of the motors disclosed in (1) to (3), the coil end portion side at the one end of the second loop overlaps, outward in the radial direction of the rotor, on the coil end portion at the one end of the first loop, and the coil end portion at the other end of the second loop overlaps, inside in the axial direction of the rotor, with the coil end portion at the other end of the first loop. Since the base units, on the coil end portion B side at the other end, overlap one on the other in the axial direction, the axial size of the coil end can be reduced. Simultaneously, since the base units, on the coil end portion A side at one end, overlap one on the other in the radial direction, the radial size of the bent coil end can be reduced.

Specifically, on the coil end portion B side at the other end, the wires in each base unit overlap radially and the base units overlap axially. Thus, the wires can be collected up three-dimensionally and the volume of the coil end at the one end can be reduced.

Simultaneously, on the coil end portion A side at one end, the wires in each base unit overlap axially and the base units overlap radially. Thus, the wires can be collected up three-dimensionally and the volume of the coil end at the other end can be reduced.

(5) In the motor in (2) or (3), in portions of each base unit forming the coil end portion side at the one end, a radius of a curved portion which is a connecting portion with the in-slot conductor portion at one side is different by wires before the flat conductor wires are bent. Accordingly, when the wires of each base unit are bent at the same time, the wires on the coil end portion A side at one end can overlap one another at the same radial position.

(6) In the motor in (2), (3), or (5), portions of each base unit forming the coil end portion at the one end are displaced before the flat conductor wires are bent, and the flat conductor wires of each base unit overlap one another at the same radial position when the flat conductor wires are bent. Accordingly, when the wires in each base unit are bent at the same time, the wires on the coil end portion A side at one end can overlap one another at the same radial position. It is to be noted that the coil end portion A side at one end and the coil end portion B side at the other end in the above explanation are given alphabets A and B for facilitating explanation.

DETAILED DESCRIPTION

A detailed description of a preferred embodiment of a motor of the present invention and a motor manufacturing method will now be given referring to the accompanying drawings.

Figure 1:
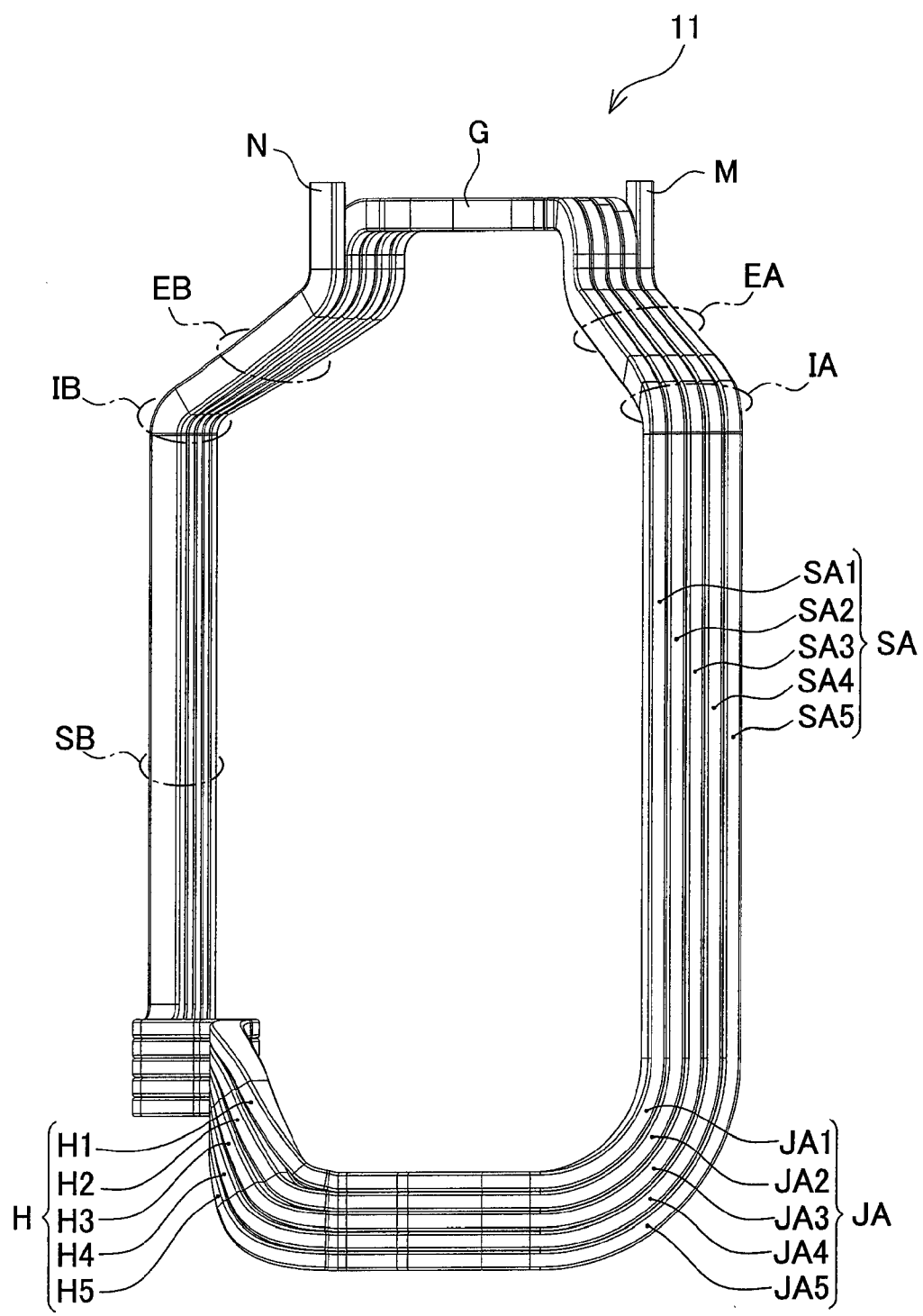
FIG. 1 is a perspective view of an outer circumference base unit.
Figure 2:
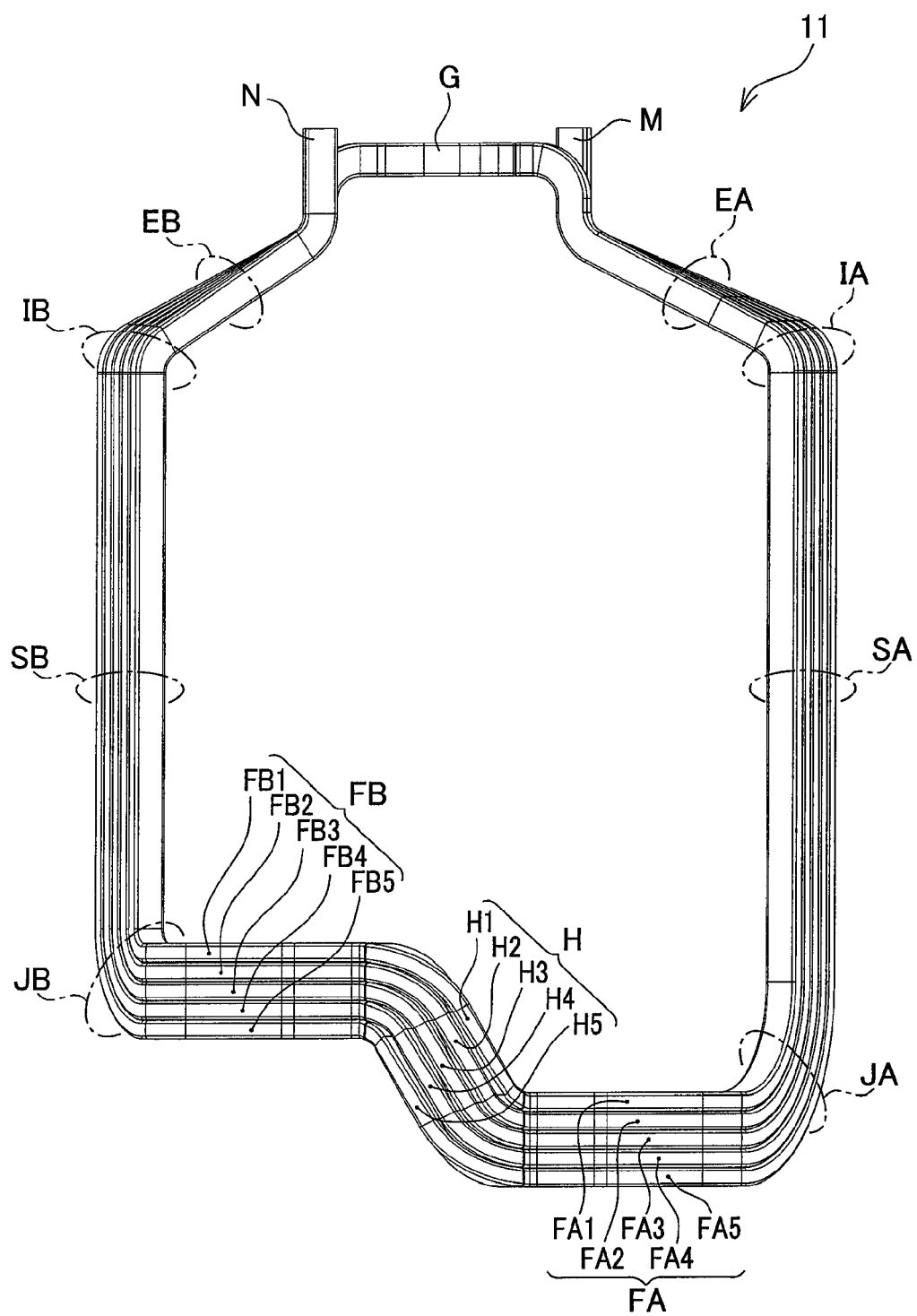
FIG. 2 is a front view of the outer circumference base unit.
Figure 3:
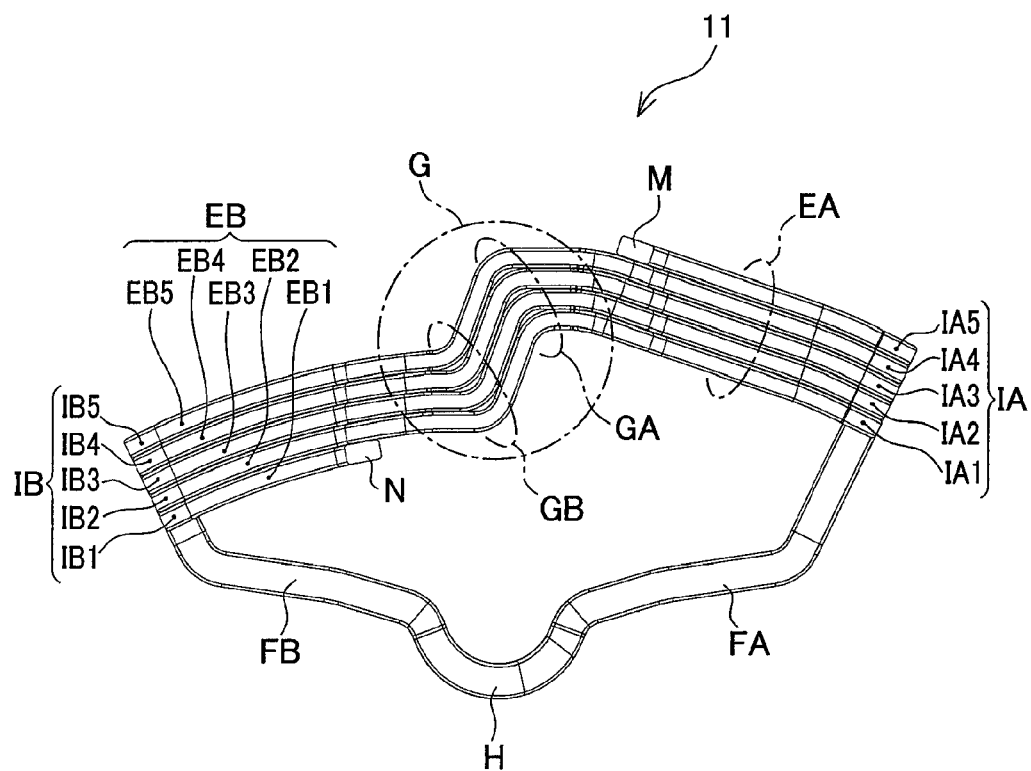
FIG. 3 is a plan view of the outer circumference base unit.
Figure 4:
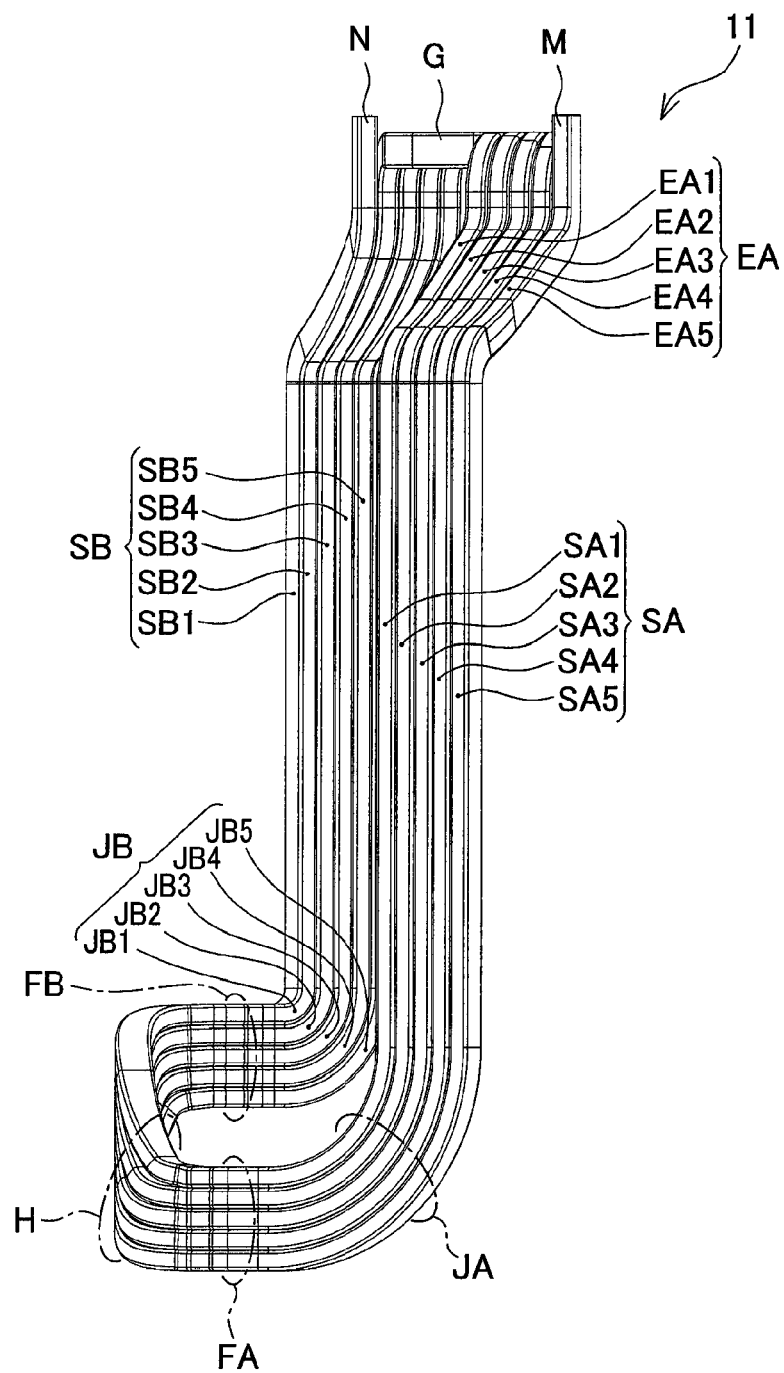
FIG. 4 is a right side view of the outer circumference base unit.

FIG. 1 is a perspective view of an outer circumference base unit ("outer base unit") 11 including five flat conductor wires (i.e., five wire portions) simultaneously formed. FIG. 2 is a front view of the outer base unit 11 of FIG. 1. FIG. 3 is a plan view of the same seen from above in FIG. 2. FIG. 4 is a right side view of FIG. 2.

The outer base unit 11 includes an in-slot conductor portion SA and an in-slot conductor portion SB to be placed respectively in slots.

As shown in FIG. 1, the in-slot conductor portion SA consists of five flat conductor wires overlapping each other so that their long-side surfaces (flatwise surfaces) are in face-to-face contact with each other. The in-slot conductor portion SA indicates an assembly of a first in-slot conductor portion SA1, a second in-slot conductor portion SA2, a third in-slot conductor portion SA3, a fourth in-slot conductor portion SA4, and a fifth in-slot conductor portion SA5. As shown in FIG. 4, the in-slot conductor portion SB consists of five flat conductor wires overlapping with their long-side surfaces (flatwise surfaces) being in face-to-face contact with each other. The in-slot conductor portion SB indicates an assembly of a first in-slot conductor portion SB1, a second in-slot conductor portion SB2, a third in-slot conductor portion SB3, a fourth in-slot conductor portion SB4, and a fifth in-slot conductor portion SB5.

At the center of a coil end portion on an upper side in FIG. 1, a raised portion G is formed. The raised portion G includes a lane change portion GA and a lane change portion GB as shown in FIG. 3. The lane change portion GA consists of an assembly of four flat conductor wires. One flat conductor wire lacks because a slant portion EA5 mentioned later is continuous to a terminal M protruding outside. Further, the lane change portion GB consists of an assembly of four flat conductor wires. One flat conductor wire lacks because a slant portion EB1 mentioned later is continuous to a terminal N protruding outside. As above, the raised portion G is an assembly of four flat conductor wires.

At an upper end of the in-slot conductor portion SA, a bent portion IA is formed. The flat conductor wires are bent at the bent portion IA toward the raised portion G as shown in FIG. 2. A slant portion EA is formed between the raised portion G and the in-slot conductor portion SA. The bent portion IA indicates an assembly of bent portions IA1, IA2, IA3, IA4, and IA5 of five flat conductor wires as shown in FIG. 3. The slant portion EA indicates an assembly of slant portions EA1, EA2, EA3, EA4, and EA5 of five flat conductor wires as shown in FIG. 4.

As shown in FIG. 4, in each of the slant portion EA, the slant portion EB, and the raised portion G, five flat conductor wires overlap one another in the radial direction (in a lateral direction in FIG. 4) as with the in-slot conductor portion SA.

At an upper end of the in-slot conductor portion SB, a bent portion IB is formed. The flat conductor wires are bent at the bent portion D3 toward the raised portion G as shown in FIG. 2. A slant portion EB is formed between the raised portion G and the in-slot conductor portion SB. The bent portion D3 indicates an assembly of bent portions IB1, IB2, IB3, IB4, and IB5 of five flat conductor wires as shown in FIG. 3. The slant portion EB indicates an assembly of slant portions EB1, EB2, EB3, EB4, and EB5 of five flat conductor wires as shown in FIG. 3.

As shown in FIG. 3, in the slant portion EB, five flat conductor wires overlap in the radial direction (in a vertical direction in FIG. 3) as with the in-slot conductor portion SB.

As shown in FIG. 4, the terminal M of EA5 located on an outermost peripheral side of the slant portion EA is bent to protrude outside. Further, the terminal N of EB1 located on an innermost peripheral side of the slant portion EB is bent to protrude outside.

At a lower end of the in-slot conductor portion SA, a bent portion JA is formed. As shown in FIG. 4, the flat conductor wires are bent 90° toward the inner periphery side (leftward in the figure) at the bent portion JA. The bent portion JA indicates an assembly of bent portions JA1, JA2, JA3, JA4, and JA5 of five flat conductor wires as shown in FIG. 1.

At a lower end of the in-slot conductor portion SB, a bent portion JB is formed. As shown in FIG. 4, the flat conductor wires are bent 90° toward the inner periphery side (leftward in the figure) at the bent portion JB. The bent portion JB indicates an assembly of bent portions JB1, JB2, JB3, JB4, and JB5 of five flat conductor wires as shown in FIG. 1.

At the center of the inner periphery side, a semicircular portion H is formed. As shown in FIG. 2, a horizontal portion FA is formed between the bent portion JA and the semicircular portion H. A horizontal portion FB is formed between the bent portion JB and the semicircular portion H.

The semicircular portion H indicates an assembly of semicircular portions H1, H2, H3, H4, and H5 of five flat conductor wires as shown in FIGS. 1 and 2. The semicircular portion H has a semicircular shape when viewed from above as shown in FIG. 3 (a plan view) and is formed as a step joining the horizontal portion FB and the horizontal portion FA when viewed from front as shown in FIG. 2 (a front view). The size of this step is designed to be larger than the thickness of the horizontal portion FA (the horizontal portion FB).

The horizontal portion FA indicates an assembly of horizontal portions FA1, FA2, FA3, FA4, and FA5 of five flat conductor wires as shown in FIG. 2. The horizontal portion FB indicates an assembly of horizontal portions FB1, FB2, FB3, FB4, and FB5 of five flat conductor wires as shown in FIG. 2. Herein, in each of the horizontal portion FA, the horizontal portion FB, and the semicircular portion H, five flat conductor wires overlap each other in the axial direction (in the vertical direction in FIG. 2) with the flatwise surfaces of the flat conductor wires placed in face-to-face contact with each other.

Figure 5:
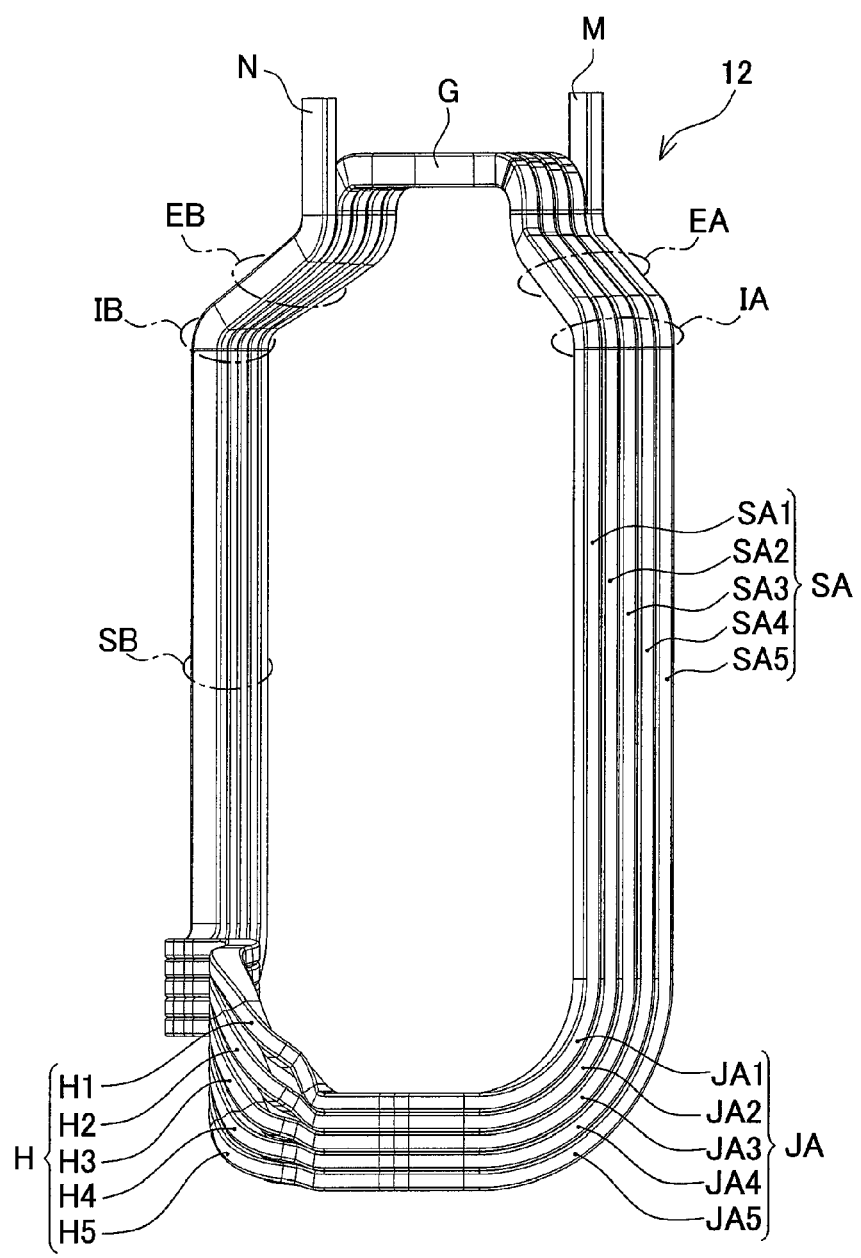
FIG. 5 is a perspective view of an inner circumference base unit.
Figure 6:
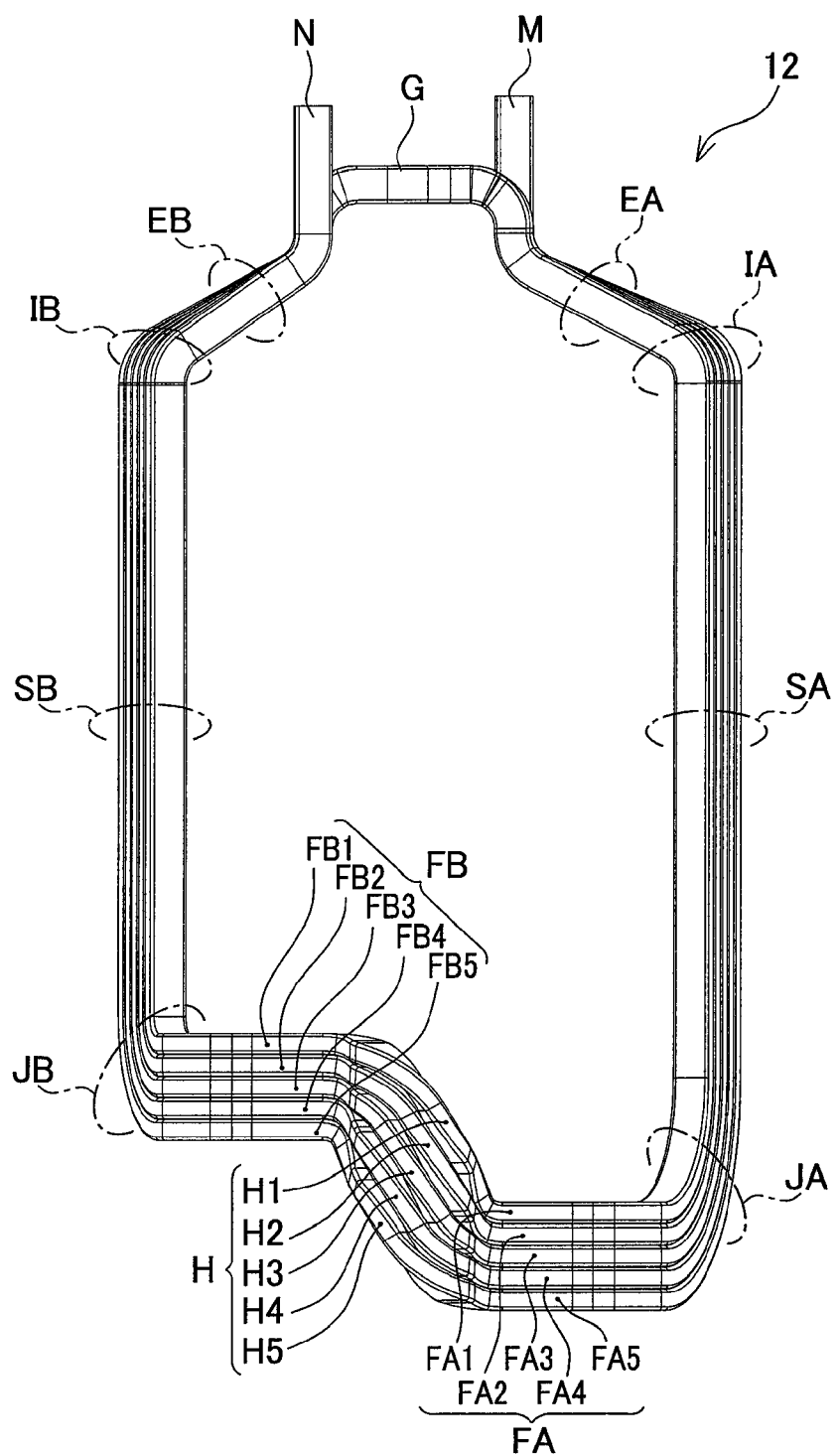
FIG. 6 is a front view of the inner circumference base unit.
Figure 7:
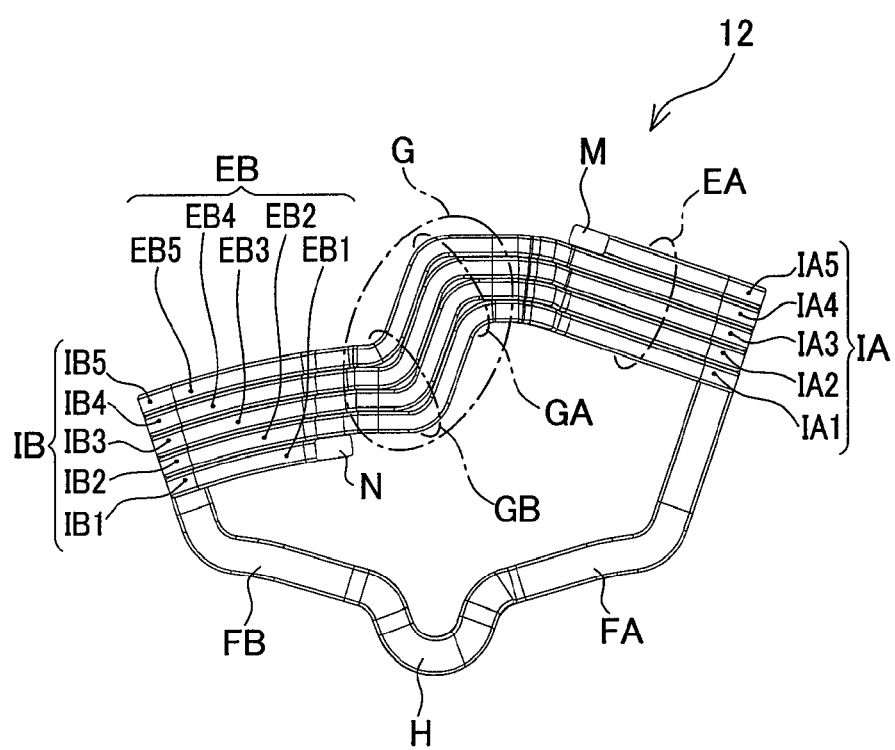
FIG. 7 is a plan view of the inner circumference base unit.
Figure 8:
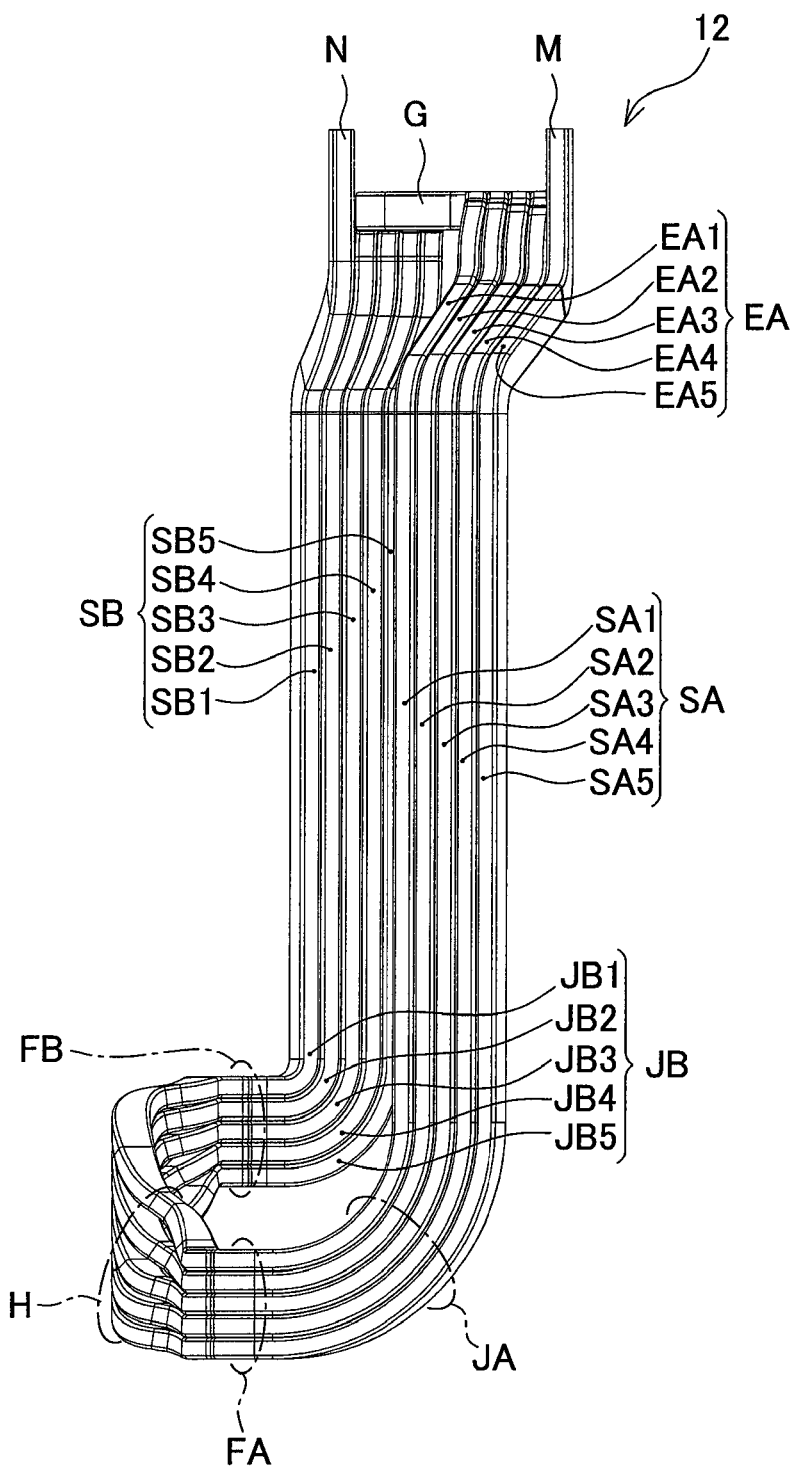
FIG. 8 is a right side view of the inner circumference base unit.

An inner circumference base unit ("inner base unit") 12 is explained below. FIG. 5 is a perspective view of the inner base unit 12 formed of five flat conductor wires shaped at the same time. FIG. 6 is a front view of the inner base unit 12 of FIG. 5. FIG. 7 is a plan view of the same seen from above in FIG. 5. FIG. 8 is a right side view of FIG. 6.

The structure of the inner base unit 12 is identical to the outer base unit 11 and simply has the size entirely smaller than the outer base unit 11 because the unit 12 is placed inside the outer base unit 11. Identical parts are therefore given the same reference signs and their details are not repeated.

Next, a manufacturing method of the outer base unit 11 will be explained below. A manufacturing method of the inner base unit 12 is the same as that of the unit 11. The manufacturing method of the base units 11 and 12 includes a winding step, an outer periphery forming step, a circular-arc forming step, a lane change portion forming step, and a bending step.

Figure 9:
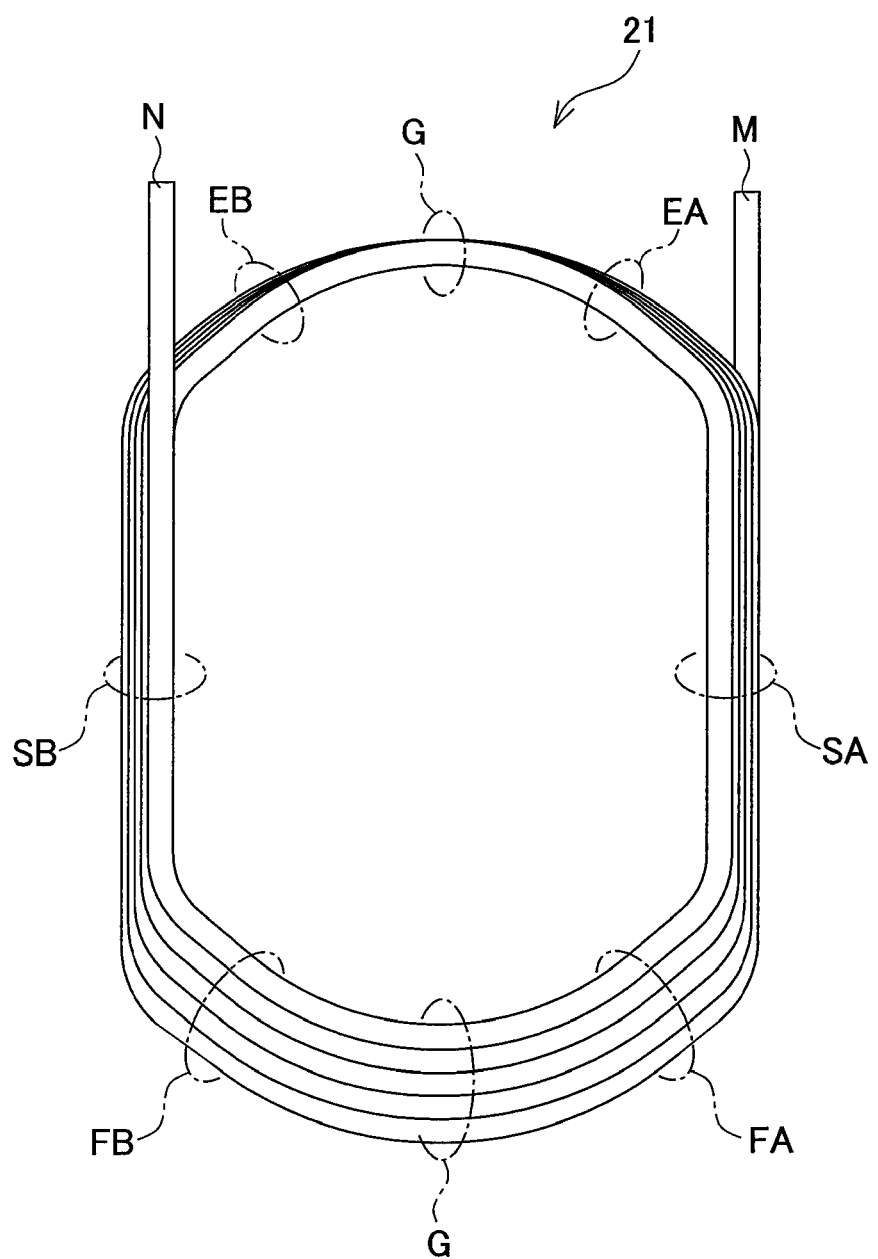
FIG. 9 is a view showing a first intermediate coil in a manufacturing process of a base unit.

FIG. 9 is a plan view of a coil 21 wound in the winding step of the manufacturing process of the base units 11 and 12. The flat conductor wire used herein has a cross-section of about 1 mm×about 10 mm. The flat conductor wire is made of copper and formed with a nichrome-plated layer on an outer periphery.

The coil 21 has terminals M and N at both ends. In the raised portion G, the flat conductor wire is wound to overlap in the flatwise direction. In the in-slot conductor portion SA and the in-slot conductor portion SB, the flat conductor wire is wound with gradual outward displacement as it is lower. In each of the semicircular portion H, the horizontal portion FA, and the horizontal portion FB, the flat conductor wire is wound with a displacement by a length (about 10 mm) in the flatwise direction of the flat conductor wire.

The outer periphery forming step will be explained below.

Figure 11:
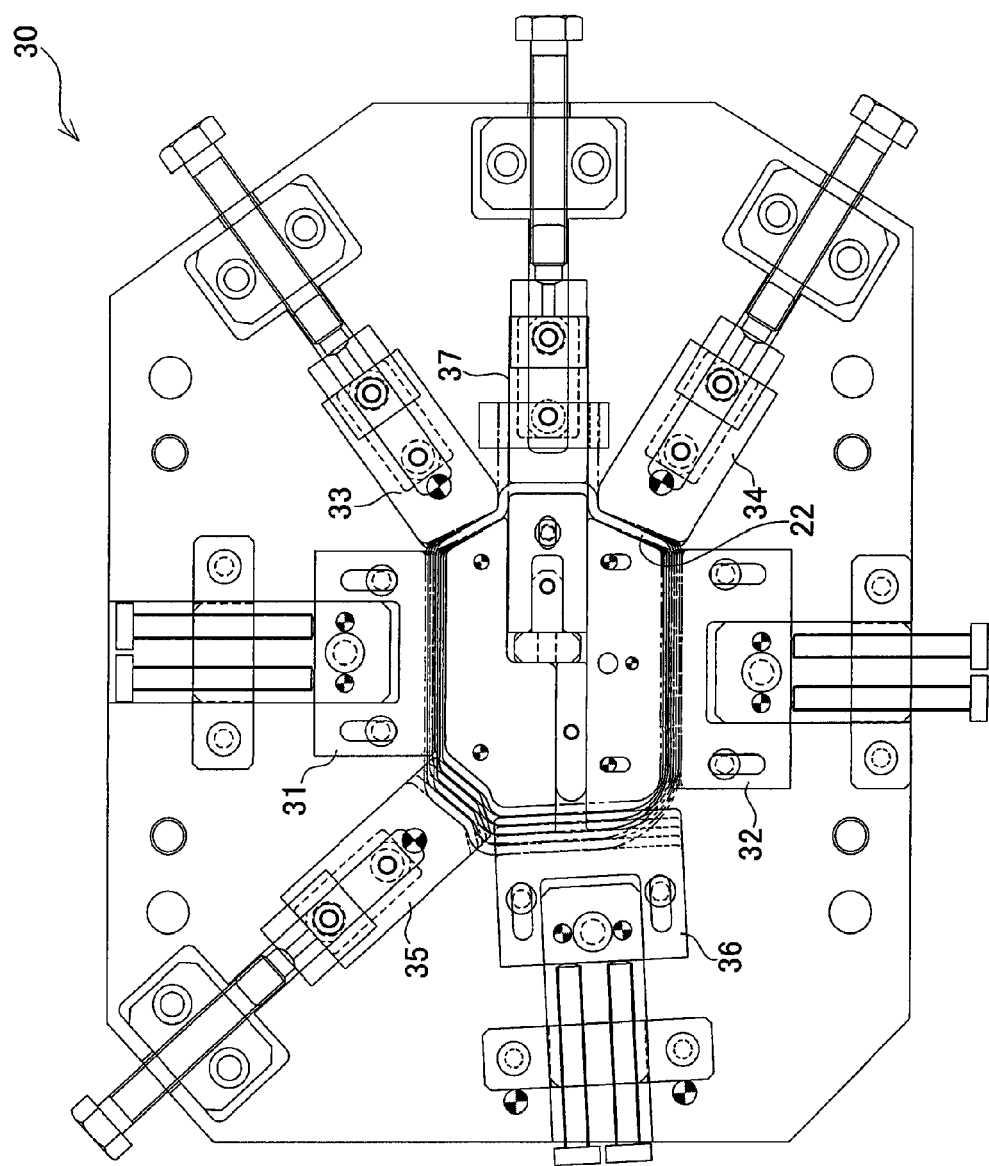
FIG. 11 is a plan view showing an outer periphery forming step of the base unit manufacturing process.
Figure 12:
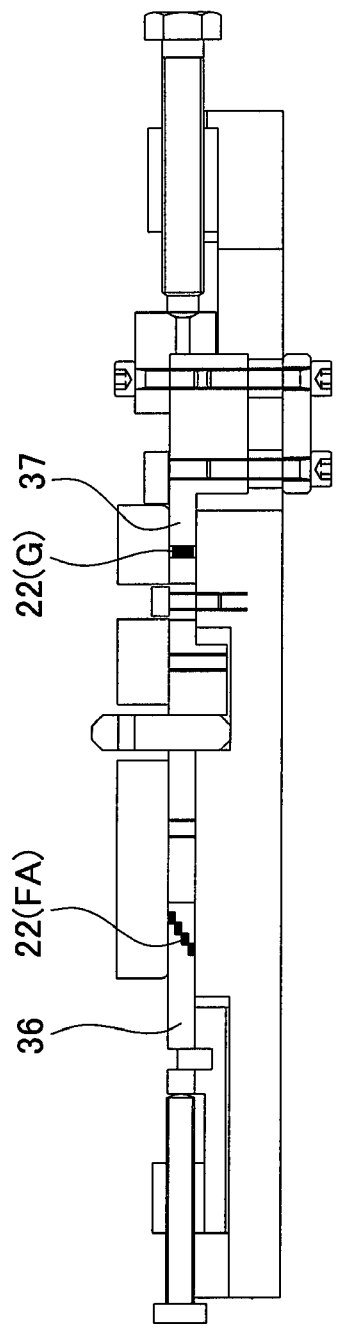
FIG. 12 is a right side view of FIG. 11.

FIGS. 11 and 12 show the outer periphery forming step of the manufacturing process of the base units 11 and 12. FIG. 12 is a right side view of FIG. 11.

A first intermediate coil 21 formed of a flat conductor wire wound by five turns in the winding step is set in an outer periphery forming position in a die 30 as shown in FIG. 11. A jig 34 is arranged in a position facing the slant portion EA. A jig 37 is placed in a position facing the raised portion G. A jig 33 is disposed in a position facing the slant portion EB.

A jig 32 is arranged in a position facing the in-slot conductor portion SA. A jig 31 is placed in a position facing the in-slot conductor portion SB. A jig 35 is disposed in a position facing the horizontal portion FB and a jig 36 is placed in a position facing the semicircular portion H and the horizontal portion FA.

Figure 10:
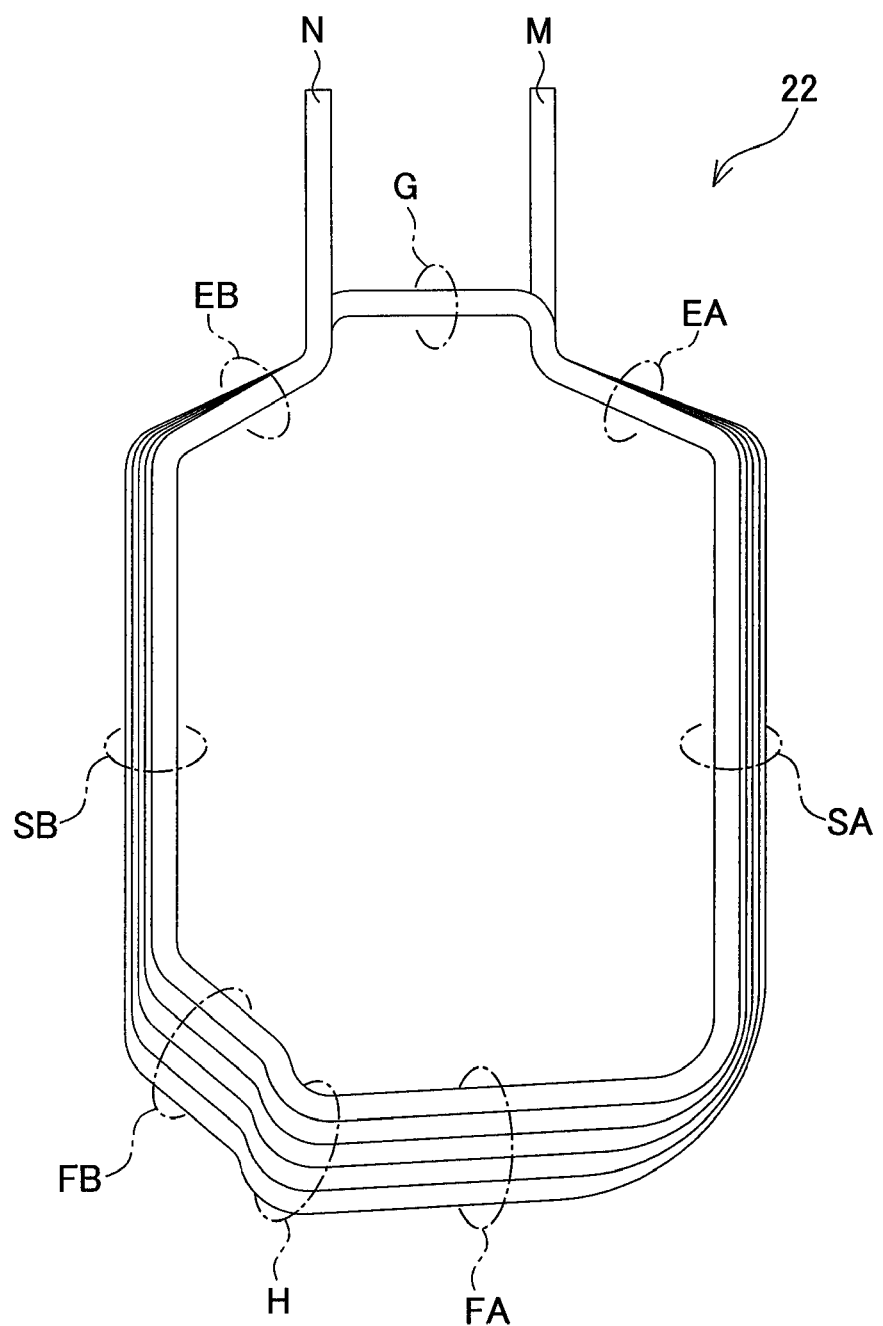
FIG. 10 is a first view of a second intermediate coil in the base unit manufacturing process.

The jigs 31, 32, 33, 34, 35, 36, and 37 are moved to respective positions shown in FIGS. 11 and 12 to form a second intermediate coil 22 shown in FIG. 10. In the second intermediate coil 22, the semicircular portion H and the horizontal portion FA are configured so that the flat conductor wires are displaced by a length (about 10 mm) in the flatwise direction as shown in FIG. 10.

The circular-arc forming step will be explained below.

Figure 13:
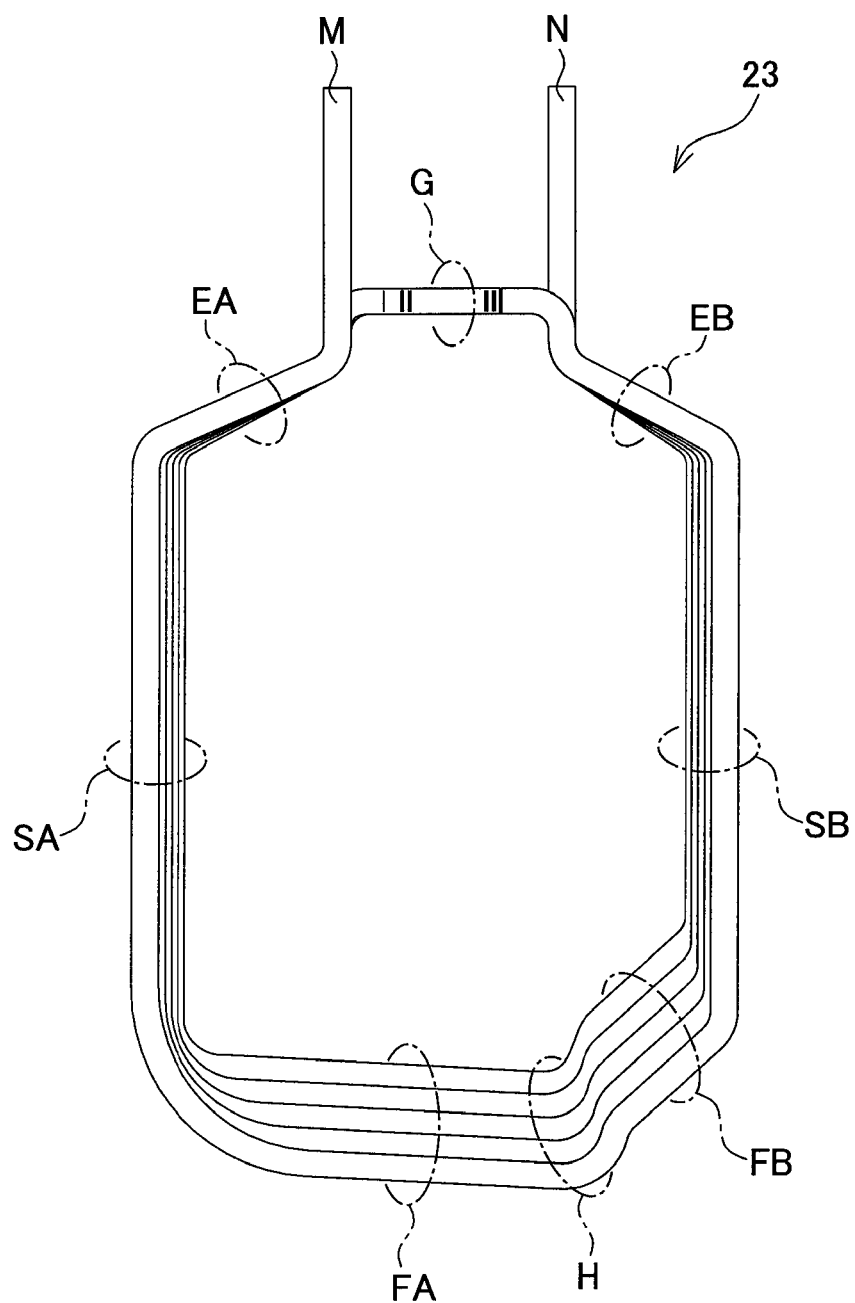
FIG. 13 is a view showing a third intermediate coil in the base unit manufacturing process.
Figure 14:
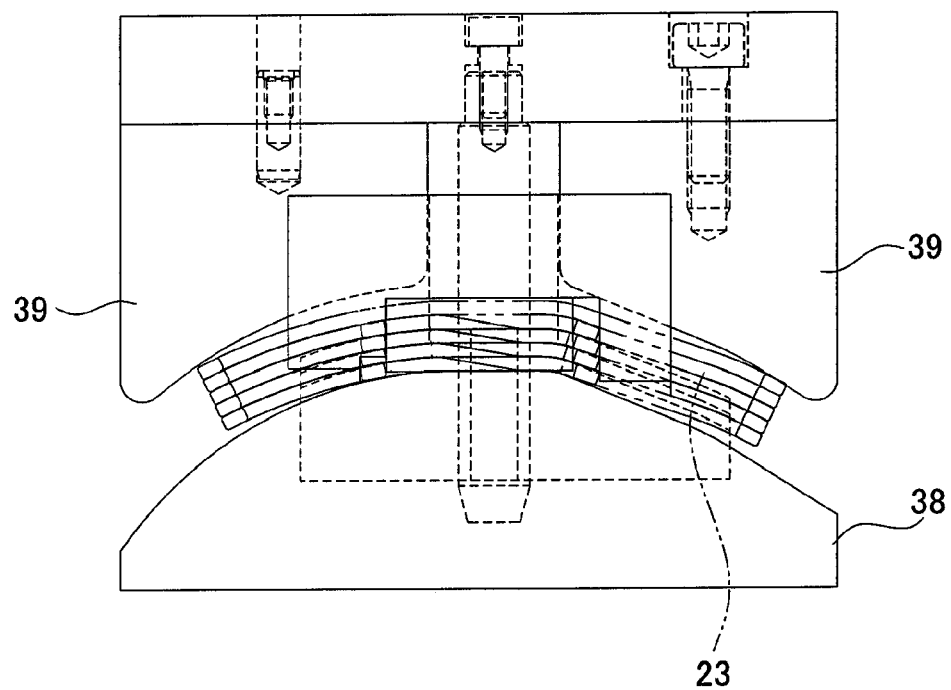
FIG. 14 is a circular-arc part forming step of the base unit manufacturing process.

As shown in FIG. 14, the coil 22 is held between a lower die 38 and a pair of upper dies 39 to gently bend the coil 22 into a circular-arc shape, thereby forming a third intermediate coil 23 shown in FIG. 13.

Figure 15:
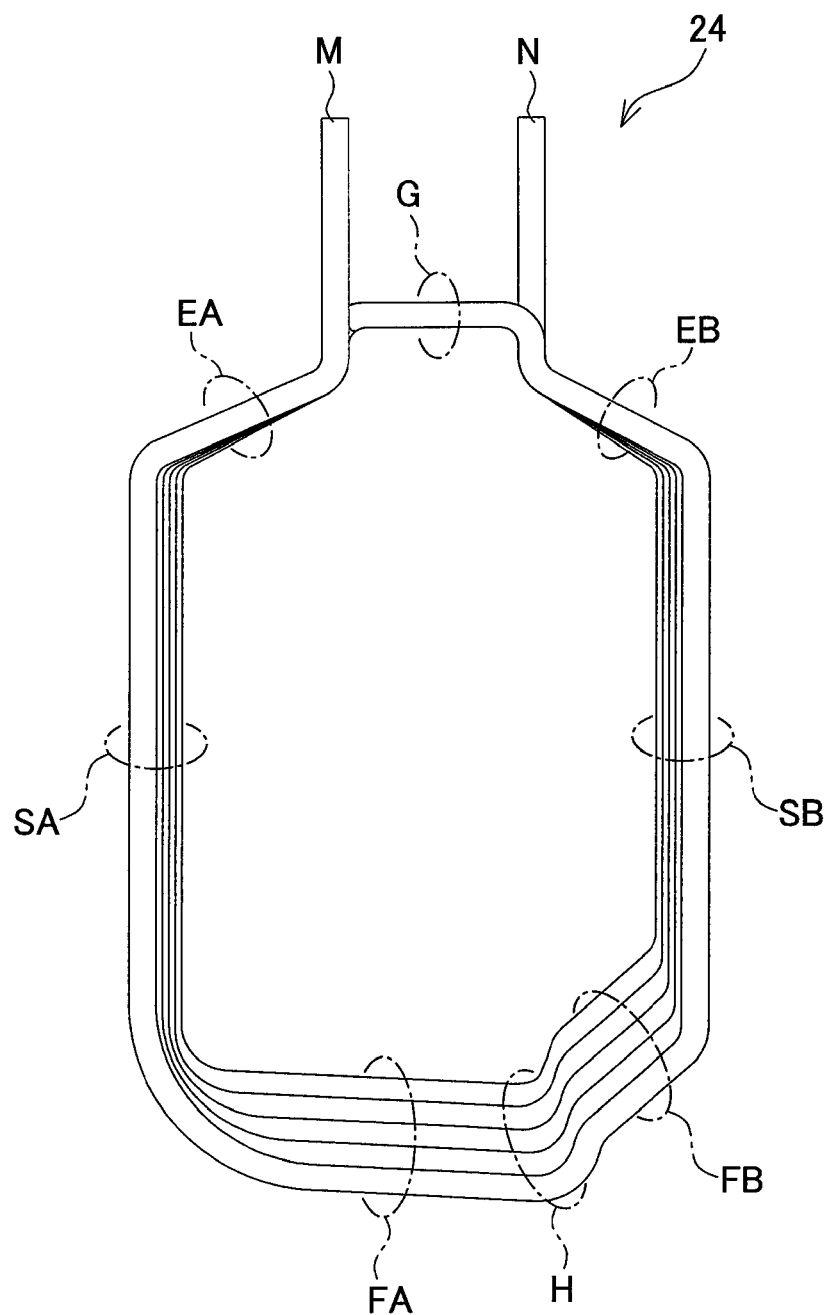
FIG. 15 is a view showing a fourth intermediate coil in the base unit manufacturing process.
Figure 16:
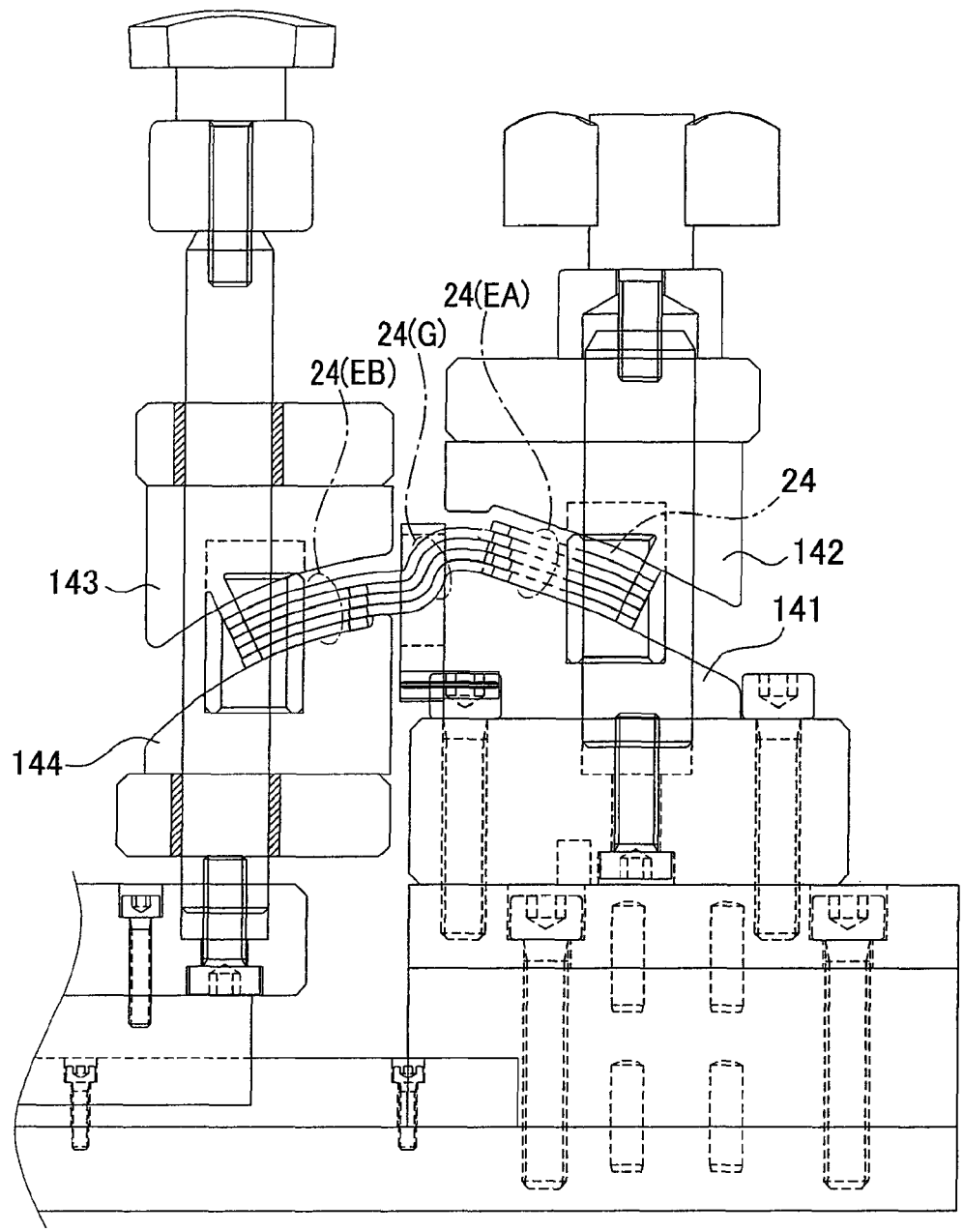
FIG. 16 is a view showing a lane change portion forming step of the base unit manufacturing process.

The lane change portion forming step will be explained. This is a process to form the lane change portion GA and the lane change portion GB in the raised portion G of the third intermediate coil 23 shown in FIG. 13. As shown in FIG. 16, the coil 23 is held between a lower die 141, a lower die 144, a stepped upper die 142, and an upper die 143 to simultaneously form the lane change portion GA and the lane change portion GB. Specifically, a part of the coil 23 held between the lower die 144 and the upper die 143 is moved in an up and down direction relative to a part of the coil 23 held between the lower die 141 and the upper die 142, thereby forming the lane change portions GA and GB. FIG. 15 shows a coil 24 formed with the lane change portions GA and GB.

The bending step will be explained.

Figure 17:
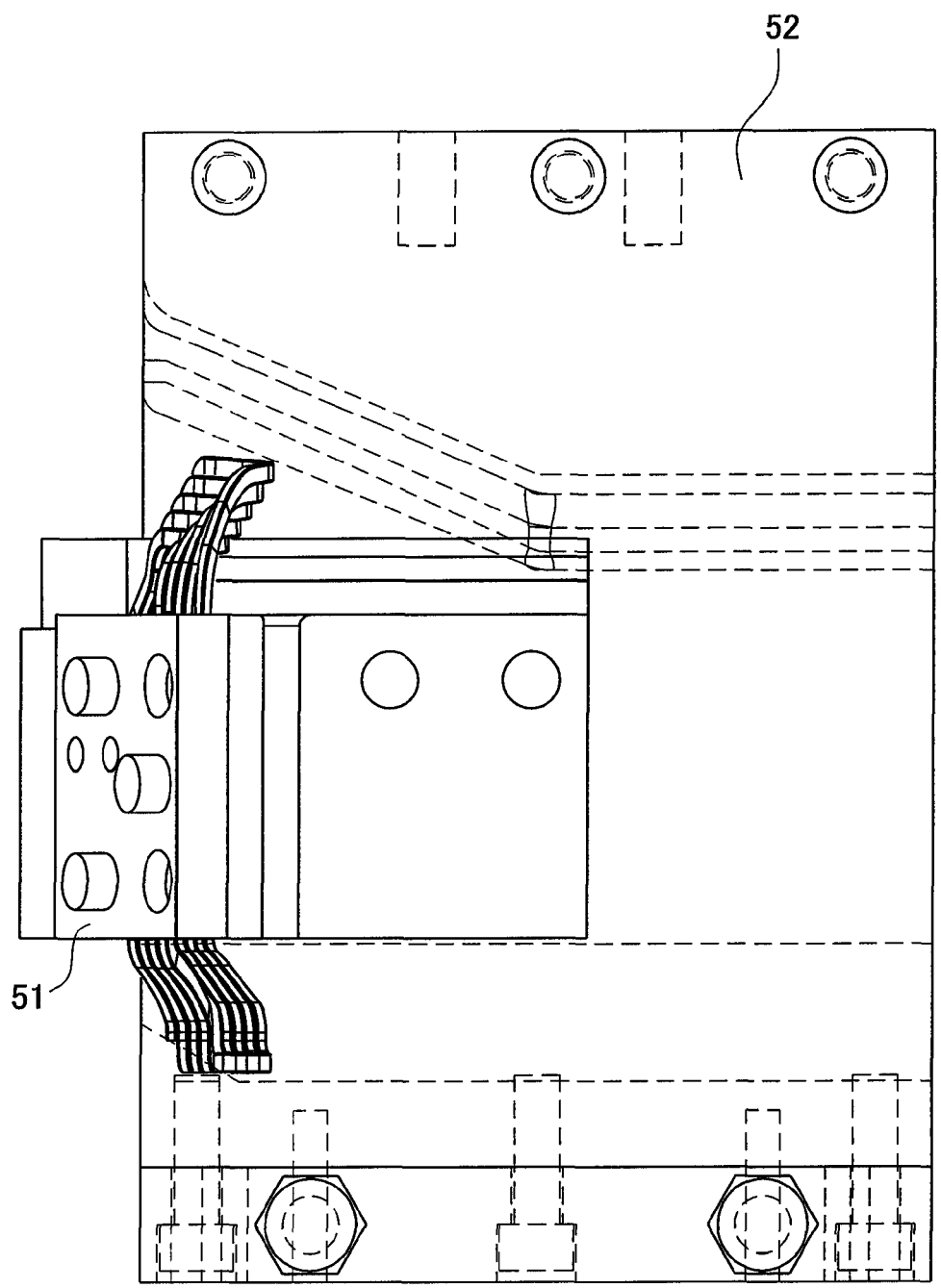
FIG. 17 is a first view showing a bending step of the base unit manufacturing process.
Figure 18:
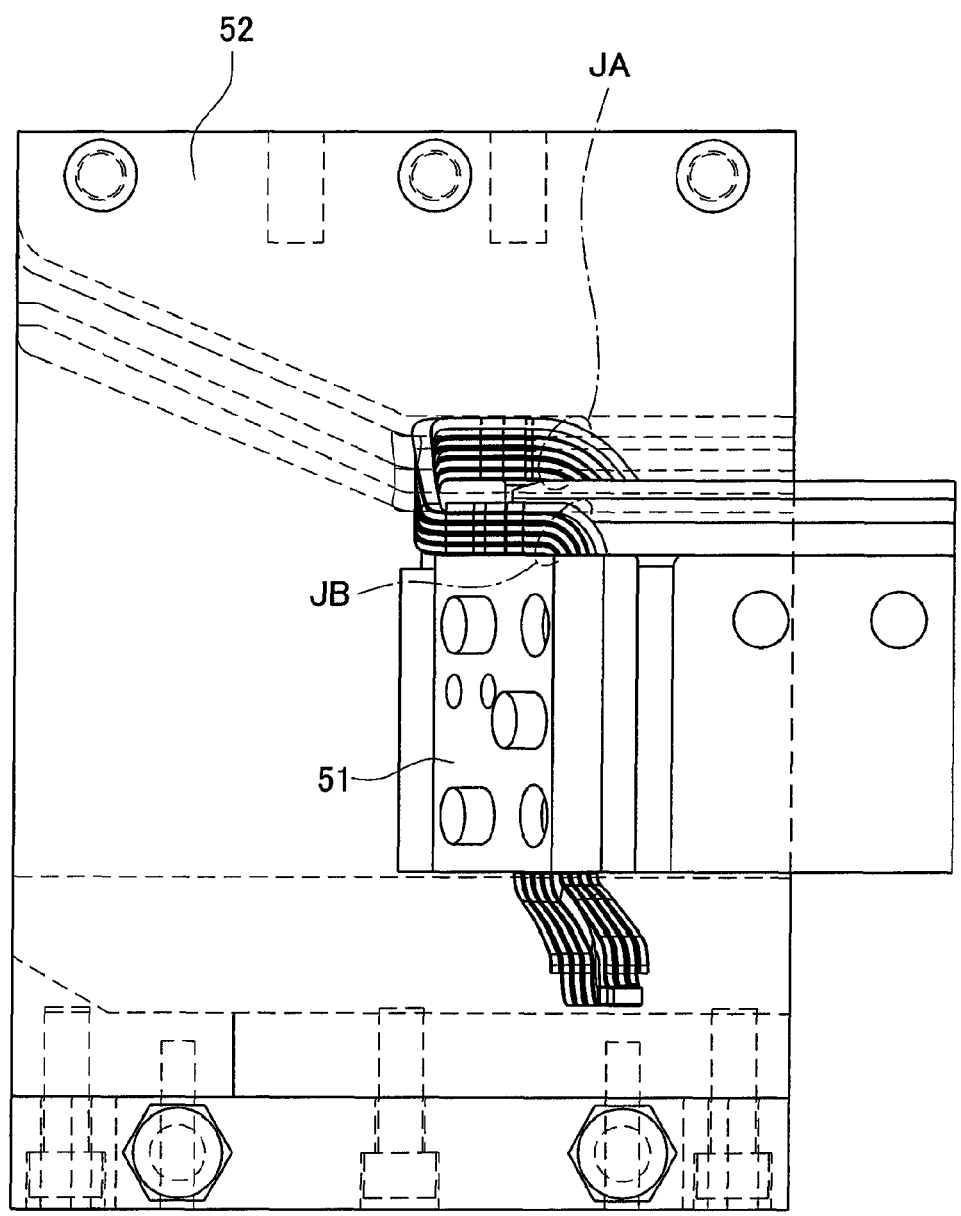
FIG. 18 is a second view showing the bending step of the base unit manufacturing process.

As shown in FIG. 17, the coil 24 is clamped by a movable die 51. The movable die 51 is held to be movable relative to a fixed die 52. The movable die 51 is moved with respect to the fixed die 52 to form the bent portions JA and JB as shown in FIG. 18.

In the coil 24 shown in FIG. 15, in the semicircular portion H and the horizontal portion FA, the flat conductor wires are displaced by a length in a flatwise direction. The angle between the in-slot conductor portion SA and the horizontal portion FA is different by wires (turns).

With the displacement and the different angles mentioned above, after the bent portions JA and JB are formed, the semicircular portion H and the horizontal portion FA are respectively formed of the flat conductor wires overlapping one another at the same radial position as shown in FIGS. 1 to 4.

Figure 19:
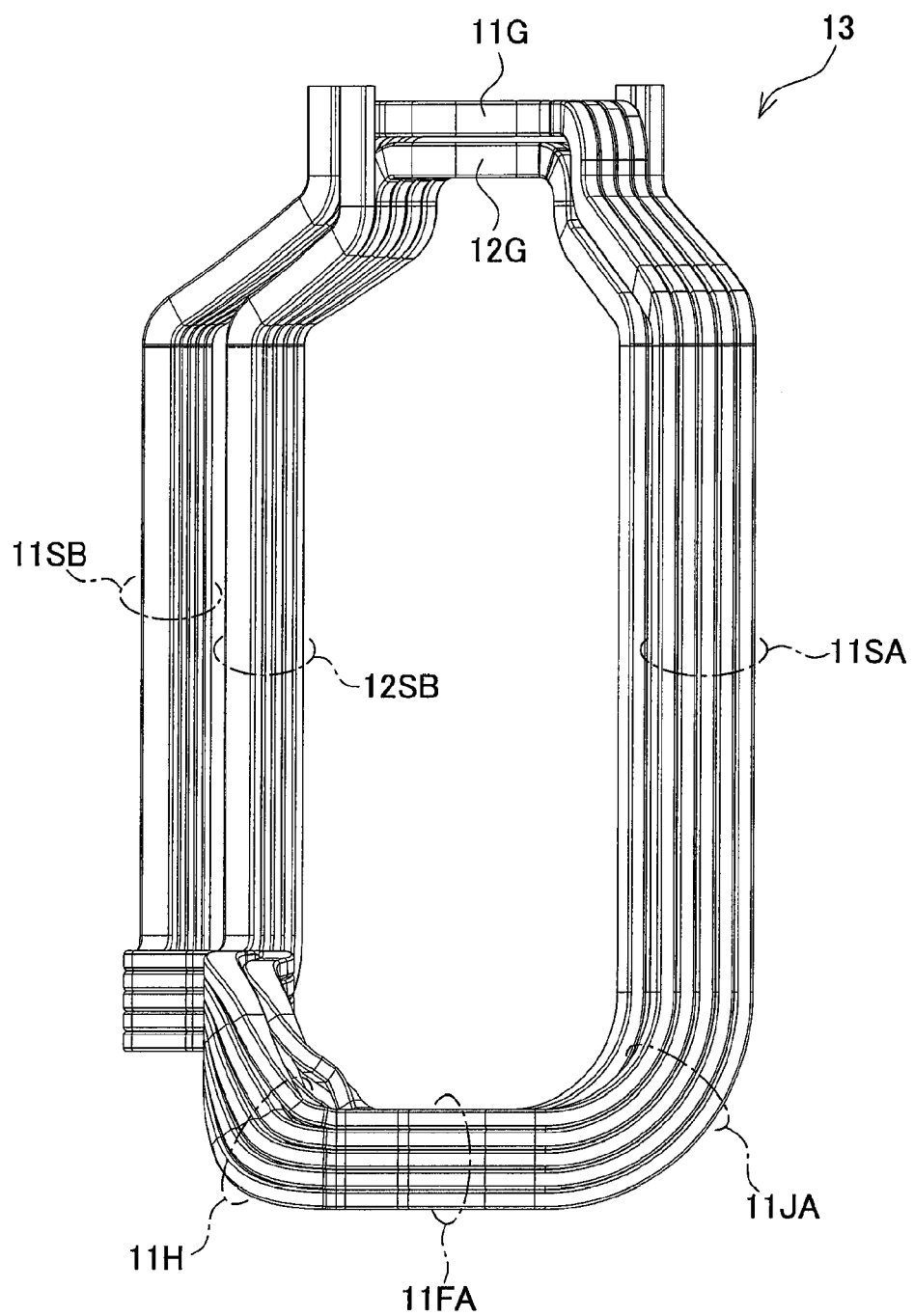
FIG. 19 is a perspective view of a double base unit.
Figure 20:
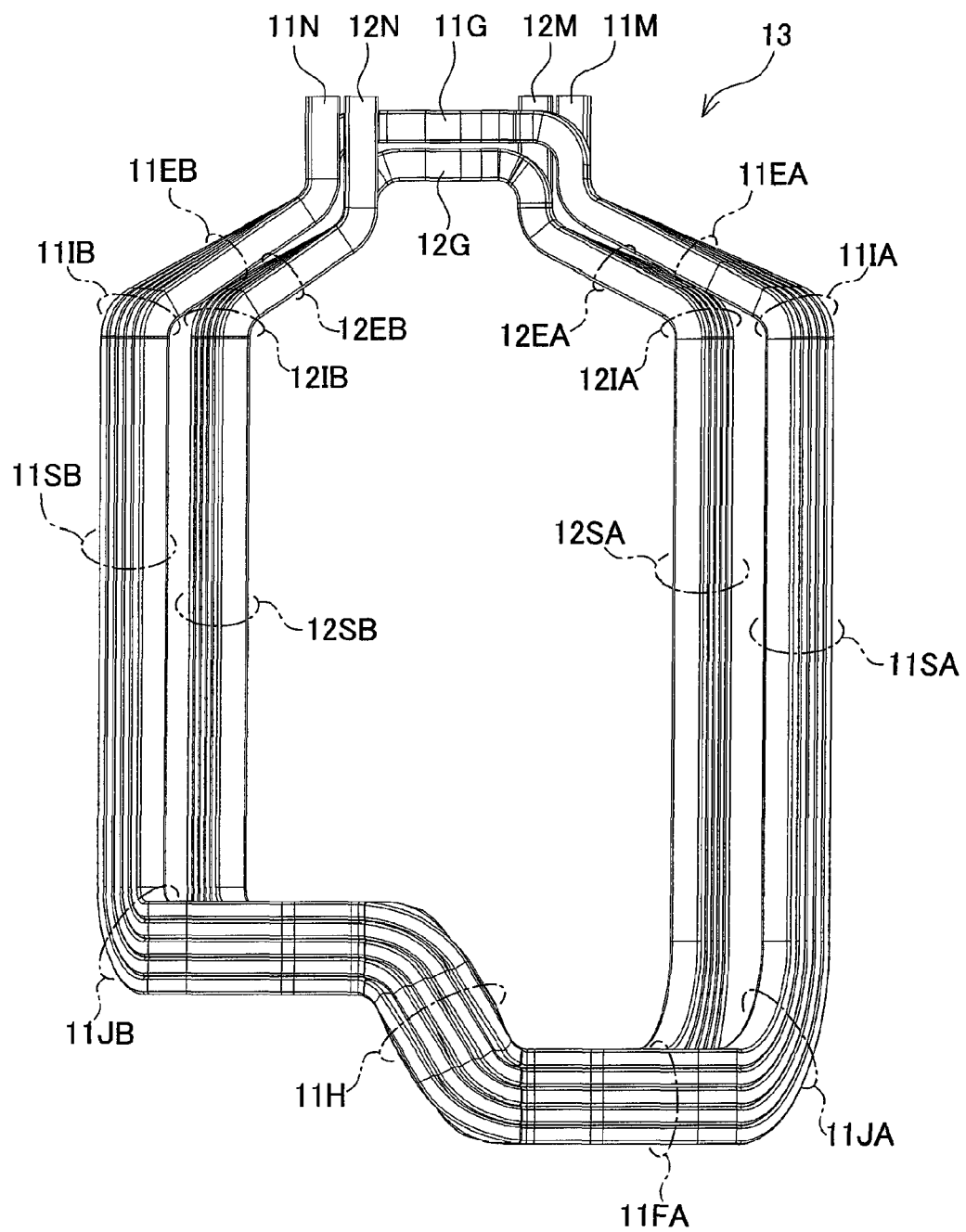
FIG. 20 is a front view of the double base unit.

A double base unit 13 consisting of the outer base unit 11 and the inner base unit 12 combined together will be explained below. FIG. 19 is a perspective view of the double base unit 13. FIG. 20 is a front view of the double base unit 13, FIG. 21 is a plan view of FIG. 20, and FIG. 22 is a right side view of FIG. 20.

As shown in FIGS. 19 and 20, the inner base unit 12 is located inside of the outer base unit 11. Specifically, a raised portion 12G, a slant portion 12EA, and a slant portion 12EB of the inner base unit 12 are positioned respectively inside (closer to the stator core) of a raised portion 11G, a slant portion 11EA, and a slant portion 11EB of the outer base unit 11 in an axial direction. Further, in-slot conductor portions 12SA and 12SB of the inner base unit 12 are located respectively on the inner circumferential side of in-slot conductor portions 11SA and 11SB of the outer base unit 11.

Figure 21:
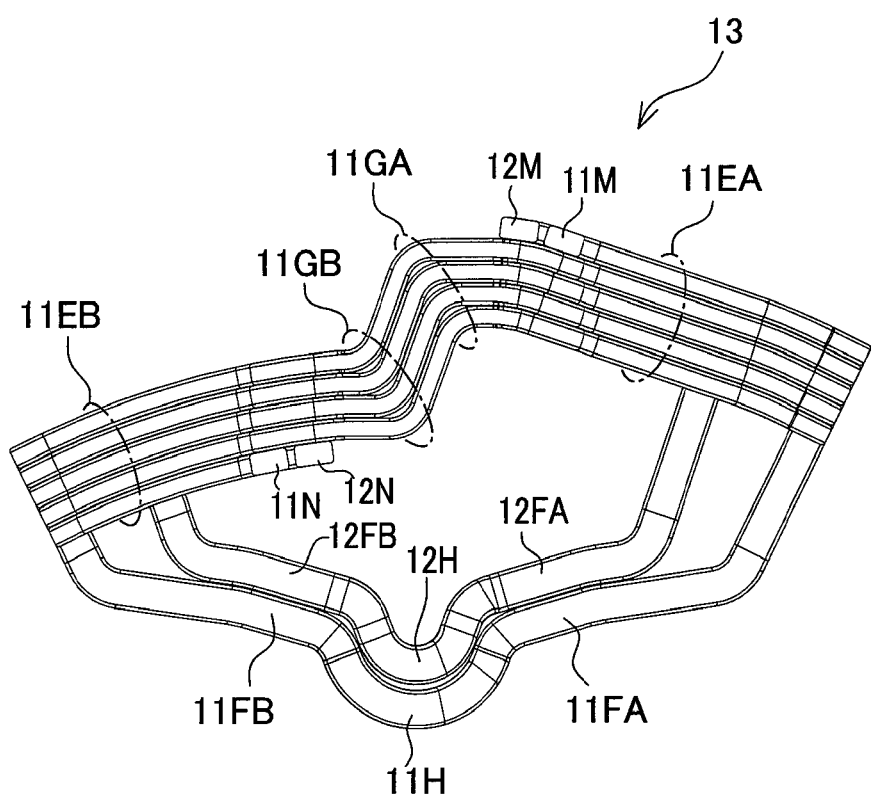
FIG. 21 is a plan view of the double base unit.
Figure 22:
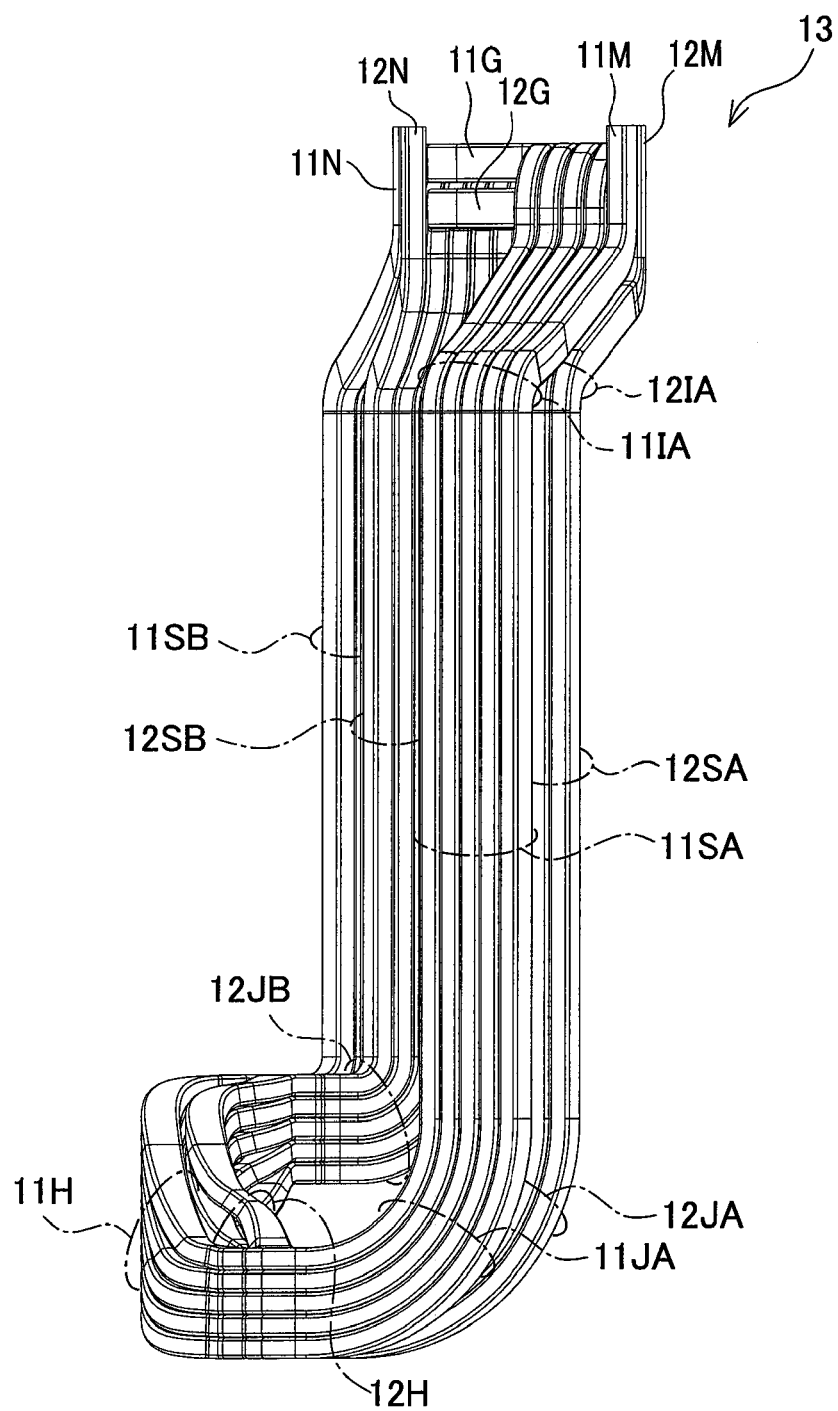
FIG. 22 is a right side view of the double base unit.

As shown in FIG. 21, a semicircular portion 12H, a horizontal portion 12FA, a horizontal portion 12FB of the inner base unit 12 are located respectively on an outside (inside with reference to the stator core), in the radial direction, of a semicircular portion 11H, a horizontal portion 11FA, and a horizontal portion 11FB of the outer base unit 11.

Subsequently, a plurality of the double base units 13 manufactured as above are combined to overlap each other.

Figure 23:
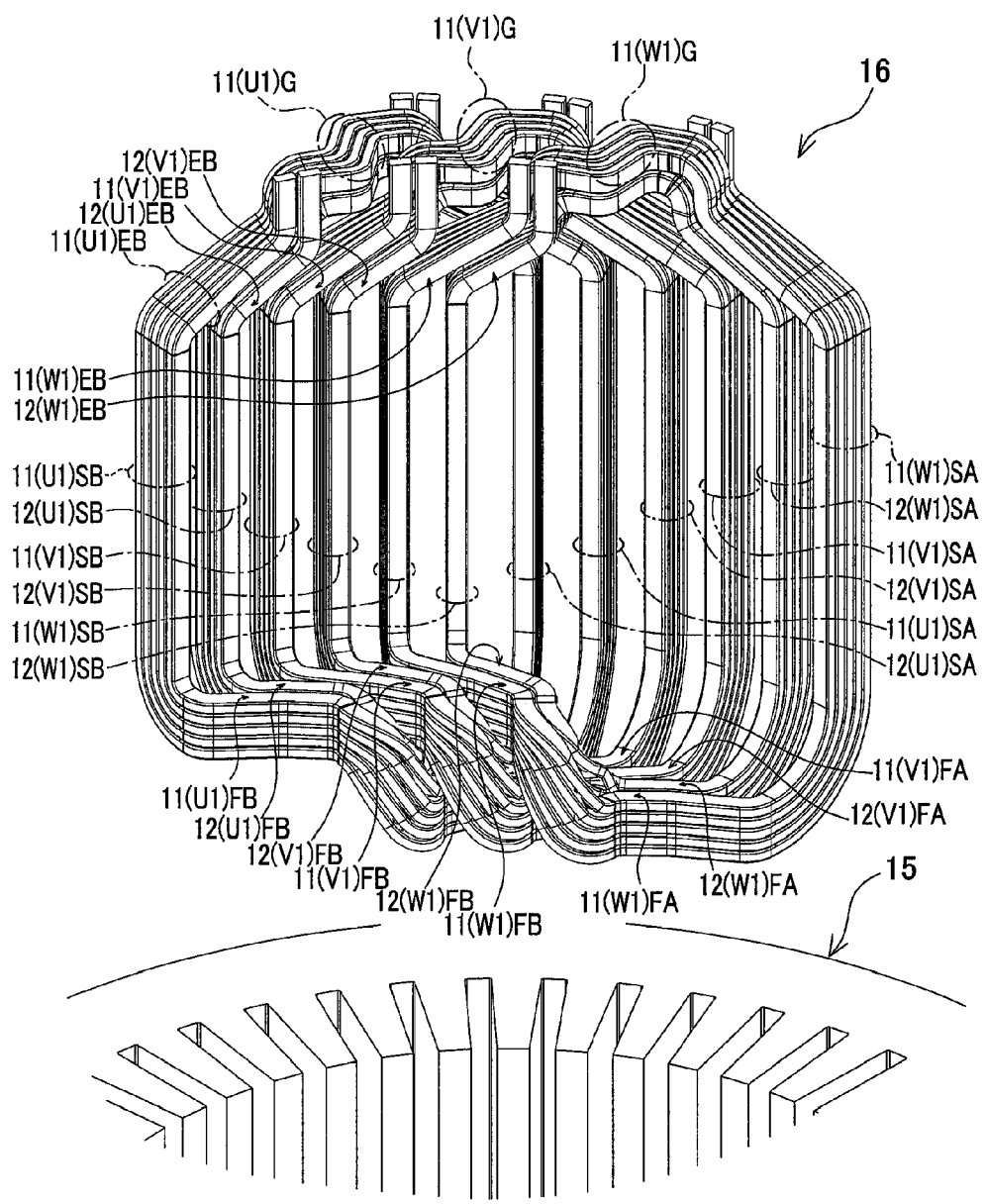
FIG. 23 is a view showing a partial assembly consisting of combined double units of three phases; U-, V-, and W-phases.

FIG. 23 shows an assembly 16 in which double base units 13U, 13V, and 13W of three phases, that is, U phase, V phase, and W phase, are combined. Specifically, the assembly 16 is illustrated in a perspective view in which a U-phase first outer base unit 11(U1), a U-phase first inner base unit 12(U1), a V-phase first outer base unit 11(V1), a V-phase first inner base unit 12(V1), a W-phase first outer base unit 11(W1), and a W-phase first inner base unit 12(W1) are overlapped.

In a slant portion 11(U1)EB of the U-phase first outer base unit 11(U1), a slant portion 12(U1)EB of the U-phase first inner base unit 12(U1), a slant portion 11(V1)EB of the V-phase first outer base unit 11(V1), a slant portion 12(V1)EB of the V-phase first inner base unit 12(V1), a slant portion 11(W1)EB of the W-phase first outer base unit 11(W1), and a slant portion 12(W1) of the W-phase first inner base unit 12(W1), five flat conductor wires (EB1 to EB5) overlap in the radial direction of the stator core 15 (rotor).

The slant portion 12(U1)EB of the U-phase first inner base unit 12(U1) is overlapped under the slant portion 11(U1)EB of the U-phase first outer base unit 11(U1) in the axial direction (in a direction toward the stator core 15). Similarly, the slant portion 11(V1)EB of the V-phase first outer base unit 11(V1) is overlapped under the slant portion 12(U1)EB of the U-phase first inner base unit 12(U1) in the axial direction.

Specifically, the slant portion 11(U1)EB of the U-phase first outer base unit 11(U1), the slant portion 12(U1)EB of the U-phase first inner base unit 12(U1), the slant portion 11(V1) EB of the V-phase first outer base unit 11(V1), the slant portion 12(V1)EB of the V-phase first inner base unit 12(V1), the slant portion 11(W1)EB of the W-phase first outer base unit 11(W1), and the slant portion 12(W1)EB of the W-phase first inner base unit 12(W1), which are placed in adjacent slots, are overlapped sequentially clockwise on the lower side of an immediately preceding slant portion EB in the axial direction.

In the U-phase first outer base unit 11(U1), the U-phase first inner base unit 12(U1), the V-phase first outer base unit 11(V1), the V-phase first inner base unit 12(V1), the W-phase first outer base unit 11(W1), and the W-phase first inner base unit 12(W1), five flat conductor wires (EA1 to EA5) overlap in the radial direction of the stator core 15 (the rotor).

The slant portion 11(U1)EA of the U-phase first outer base unit 11(U1) is overlapped on the upper side (in an opposite direction to the stator core 15) of the slant portion 12(U1)EA of the U-phase first inner base unit 12(U1) in the axial direction. Similarly, the slant portion 11(V1)EA of the V-phase first outer base unit 11(V1) is overlapped on the upper side of the slant portion 12(U1)EA of the U-phase first inner base unit 12(U1) in the axial direction.

Specifically, the slant portion 11(U1)EA of the U-phase first outer base unit 11(U1), the slant portion 12(U1)EA of the U-phase first inner base unit 12(U1), the slant portion 11(V1) EA of the V-phase first outer base unit 11(V1), the slant portion 12(V1)EA of the V-phase first inner base unit 12(V1), the slant portion 11 (W1)EA of the W-phase first outer base unit 11(W1), and the slant portion 12(W1)EA of the W-phase first inner base unit 12(W1), which are arranged in adjacent slots, are overlapped sequentially clockwise on the upper side of an immediately preceding slant portion EA in the axial direction.

In each horizontal portion FB of the U-phase first outer base unit 11(U1), the U-phase first inner base unit 12(U1), the V-phase first outer base unit 11(V1), the V-phase first inner base unit 12(V1), the W-phase first outer base unit 11(W1), and the W-phase first inner base unit 12(W1), five flat conductor wires (FB1 to FB5) overlap one another in the axial direction of the stator core 15 (the rotor).

The horizontal portion 12(U1)FB of the U-phase first inner base unit 12(U1) overlaps, in a radial, clockwise outward position (on the inner side relative to the stator core), on the horizontal portion 11(U1)FB of the U-phase first outer base unit 11(U1). The horizontal portion 11(V1)FB of the V-phase first outer base unit 11(V1) overlaps, in a radial, clockwise outward position, on the horizontal portion 12(U1)FB of the U-phase first inner base unit 12(U1).

Figure 27:
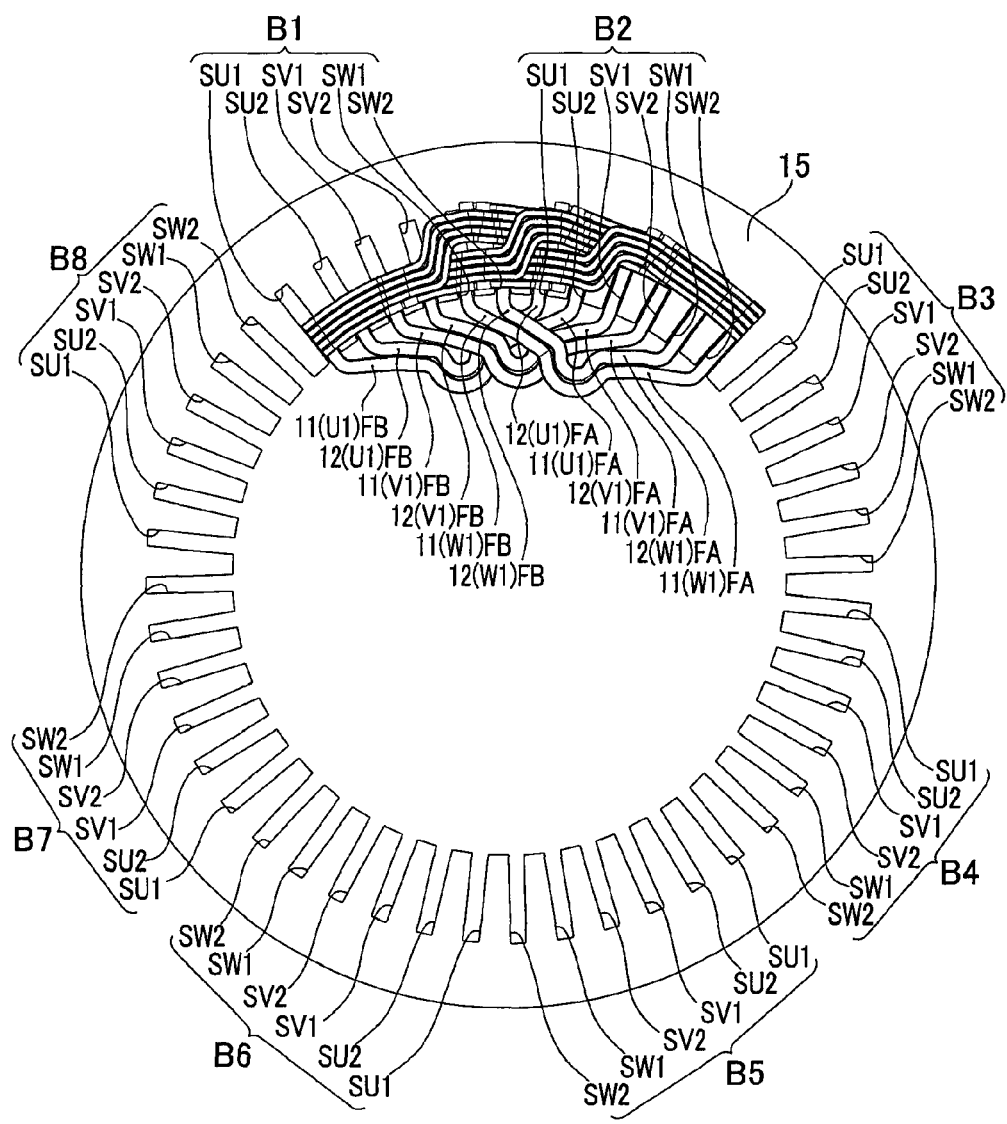
FIG. 27 is a third view showing the inserting step of inserting the part of the cage coil in the stator core.

Specifically, as shown in FIGS. 23 and 27, in the U-phase first outer base unit 11(U1), the U-phase first inner base unit 12(U1), the V-phase first outer base unit 11(V1), the V-phase first inner base unit 12(V1), the W-phase first outer base unit 11(W1), and the W-phase first inner base unit 12(W1), which are arranged in adjacent slots, the horizontal portions 11(U1) FB, 12(U1)FB, 11(V1)FB, 12(V1)FB, 11(W1)FB, and 12(W1)FB overlap, in a radial, clockwise outward position (inside relative to the stator core), on an immediately preceding horizontal portion FB.

In the horizontal portions FA of the U-phase first outer base unit 11(U1), U-phase first inner base unit 12(U1), V-phase first outer base unit 11(V1), V-phase first inner base unit 12(V1), W-phase first outer base unit 11(W1), and W-phase first inner base unit 12(W1), five rectangular conductor wires (FA1 to FA5) overlap one another in the axial direction of the stator core 15 (rotor).

The horizontal portion 12 (U1) FA of the U-phase first inner base unit 12(U1) overlaps, in a radial, clockwise inward position, on the horizontal portion 11 (U1) of the U-phase first outer base unit 11(U1). The horizontal portion 11 (V1) of the V-phase first outer base unit 11(V1) overlaps, in a radial, clockwise inward position, on the horizontal portion 12 (U1) FA of the U-phase first inner base unit 12(U1).

Specifically, as shown in FIGS. 23 and 27, in the U-phase first outer base unit 11(U1), U-phase first inner base unit 12(U1), V-phase first outer base unit 11(V1), V-phase first inner base unit 12(V1), W-phase first outer base unit 11(W1), and W-phase first inner base unit 12(W1), which are placed in adjacent slots, the horizontal portions 11(U1)FA, 12(U1)FA, 11(V2)FA, 12(V1)FA, 11(W1)FA, 12(W1)FA overlap sequentially, in the radial, clockwise, inward position, on the respective immediately-preceding horizontal portions FA.

As shown in FIG. 23, in each raised portion G of the U-phase first outer base unit 11(U1), U-phase first inner base unit 12(U1), V-phase first outer base unit 11(V1), V-phase first inner base unit 12(V1), W-phase first outer base unit 11(W1), and W-phase first inner base unit 12(W1), four flat conductor wires (G2 to G5) overlap each other in the radial direction of the stator core 15 (rotor).

As shown in FIG. 23, a raised portion 11(U1)G of the U-phase first outer base unit 11(U1), a raised portion 11(V1)G of the V-phase first outer base unit 11(V1), and a raised portion 11(W1)G of the W-phase first outer base unit 11(W) are displaced in the radial direction.

Further, a semicircular portion 11(U1)H of the U-phase first outer base unit 11(U1), a semicircular portion 11(V1)H of the V-phase first outer base unit 11(V1), and a semicircular portion 11(W1)H of the W-phase first outer base unit 11(W1) are displaced in the radial direction.

When the outer base units 11 and the inner base units 12 are assembled by twenty-four pieces in total, this assembly takes a semicircular form. Two of such assemblies are manufactured and combined to complete a circular cage-shaped coil (case coil) 14 including twenty-four outer base units 11 and the twenty-four inner base units 12 in overlapping fashion.

Figure 24:
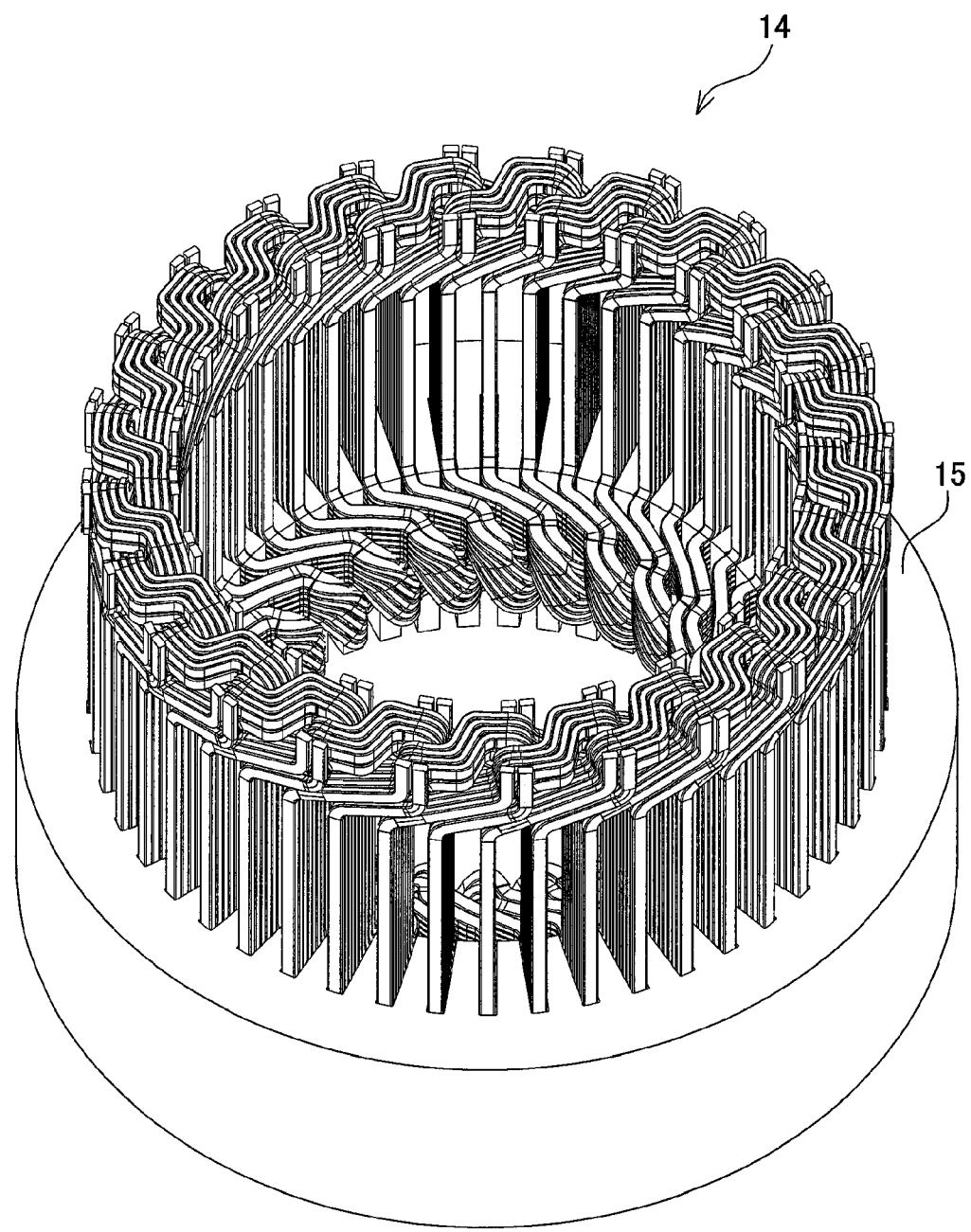
FIG. 24 is a plan view of an entire cage coil.

The configuration of the cage coil 14 is shown in a perspective view of FIG. 24. The stator core of a stator of a motor in the present embodiment has forty-eight slots and forty-eight teeth.

Each of the outer base unit 11 and the inner base unit 12 includes two in-slot conductor portions SA and SB. These in-slot conductor portions SA and SB are located with a lane change corresponding to the thickness of five flat conductor wires in the radial direction as shown in FIG. 27.

The stator core 15 is formed with forty-eight slots S as shown in FIGS. 24 and 27. The slots S include a total of eight group blocks; a first group block B1, a second group block B2, . . . , an eighth group block B8. Each group block B includes six slots; a U-phase first slot SU1, a U-phase second slot SU2, a V-phase first slot SV1, a V-phase second slot SV2, a W-phase first slot SW1, and a W-phase second slot SW2. Hereinafter, the U-phase first slot SU1, the U-phase second slot SU2, the V-phase first slot SV1, the V-phase second slot SV2, the W-phase first slot SW1, and the W-phase second slot SW2 are referred collectively to as a slot S. On the inner periphery side of the U-phase first slot SU1 of the first group block B1, the in-slot conductor portion 11(U1)SB of the U-phase first outer base unit 11(U1) is inserted. On the inner periphery side of the U-phase second slot SU2, the in-slot conductor portion 12(U1)SB of the U-phase first inner base unit 12(U1) is inserted.

Similarly, on the inner periphery side of the V-phase first slot SV1 of the first group block B1, the in-slot conductor portion 11(V1)SB of the V-phase first outer base unit 11(V1) is inserted. On the inner periphery side of the V-phase second slot SV2, the in-slot conductor portion 12(V1)SB of the V-phase first inner base unit 12(V1) is inserted.

Similarly, on the inner periphery side of the W-phase first slot SW1 of the first group block B1, the in-slot conductor portion 11(W1)SB of the W-phase first outer base unit 11(W1) is inserted. On the inner periphery side of the W-phase second slot SW2, the in-slot conductor portion 12(W1) of the W-phase first inner base unit 12(W1) is inserted.

On the outer periphery side of the U-phase first slot SU1 of the second group block B2, the in-slot conductor portion 12(U1)SA of the U-phase first inner base unit 12(U1) is inserted. On the outer periphery side of the U-phase second slot SU2, the in-slot conductor portion 11(U1)SA of the U-phase first outer base unit 11(U1) is inserted.

Similarly, on the outer periphery side of the V-phase first slot SV1 of the second group block B2, the in-slot conductor portion 12(V1)SA of the V-phase first inner base unit 12(V1) is inserted. On the outer periphery side of the V-phase second slot SV2, the in-slot conductor portion 11(V1)SA of the V-phase first outer base unit 11(V1) is inserted.

Similarly, on the outer periphery side of the W-phase first slot SW1 of the second group block B2, the in-slot conductor portion 12(W1)SA of the W-phase first inner base unit 12(W1) is inserted. On the outer periphery side of the W-phase second slot SW2, the in-slot conductor portion 11(W1)SA of the W-phase first outer base unit 11(W1) is inserted.

Subsequently, the in-slot conductor portions SA and SB are inserted in turn in the corresponding slots of the third group block B3, the fourth group block B4, the fifth group block B5, the sixth group block B6, and the seventh group block B7.

Finally, on the inner periphery side of the U-phase first slot SU1 of the eighth block B8, the in-slot conductor portion 11(U8)SB of the U-phase eighth outer base unit 11(U8) is inserted. On the inner periphery side of the U-phase second slot SU2, the in-slot conductor portion 12(U8)SB of the U-phase eighth inner base unit 12(U8) is inserted.

Similarly, on the inner periphery side of the V-phase first slot SV1 of the eighth block B8, the in-slot conductor portion 11(V8)SB of the V-phase eighth outer base unit 11(V8) is inserted. On the inner periphery side of the V-phase second slot SV2, the in-slot conductor portion 12(V8)SB of the V-phase eighth inner base unit 12(V8) is inserted.

Similarly, on the inner periphery side of the W-phase first slot SW1 of the eighth block B8, the in-slot conductor portion 11(W8)SB of the W-phase eighth outer base unit 11 (W8) is inserted. On the inner periphery side of the W-phase second slot SW2, the in-slot conductor portion 12(W8)SB of the W-phase eighth inner base unit 12(W8) is inserted.

Further, on the outer periphery side of the U-phase first slot SU1 of the first group block B1, the in-slot conductor portion 12(U8)SA of the U-phase eighth inner base unit 12(U8) is inserted. On the outer periphery side of the U-phase second slot SU2, the in-slot conductor portion 11(U8)SA of the U-phase eighth outer base unit 11(U8) is inserted.

Similarly, on the outer periphery side of the V-phase first slot SV1 of the first group block B1, the in-slot conductor portion 12(V8)SA of the V-phase eighth inner base unit 12(V8) is inserted. On the outer periphery side of the V-phase second slot SV2, the in-slot conductor portion 11(V8)SA of the V-phase eighth outer base unit 11(V8) is inserted.

Similarly, on the outer periphery side of the W-phase first slot SW1 of the first group block B1, the in-slot conductor portion 12(W8)SA of the W-phase eighth inner base unit 12(W8) is inserted. On the outer periphery side of the W-phase second slot SW2, the in-slot conductor portion 11(W8)SA of the W-phase eighth outer base unit 11(W8) is inserted.

Three phases, i.e., U phase, V phase, and W phase, each include sixteen base units having eight outer base units 11 and eight inner base units 12, that is, a total of forty-eight base units.

In each slot, two sets of flat conductor wires, each set having five flat conductor wires, i.e., a total of ten flat conductor wires, are inserted.

Figure 25:
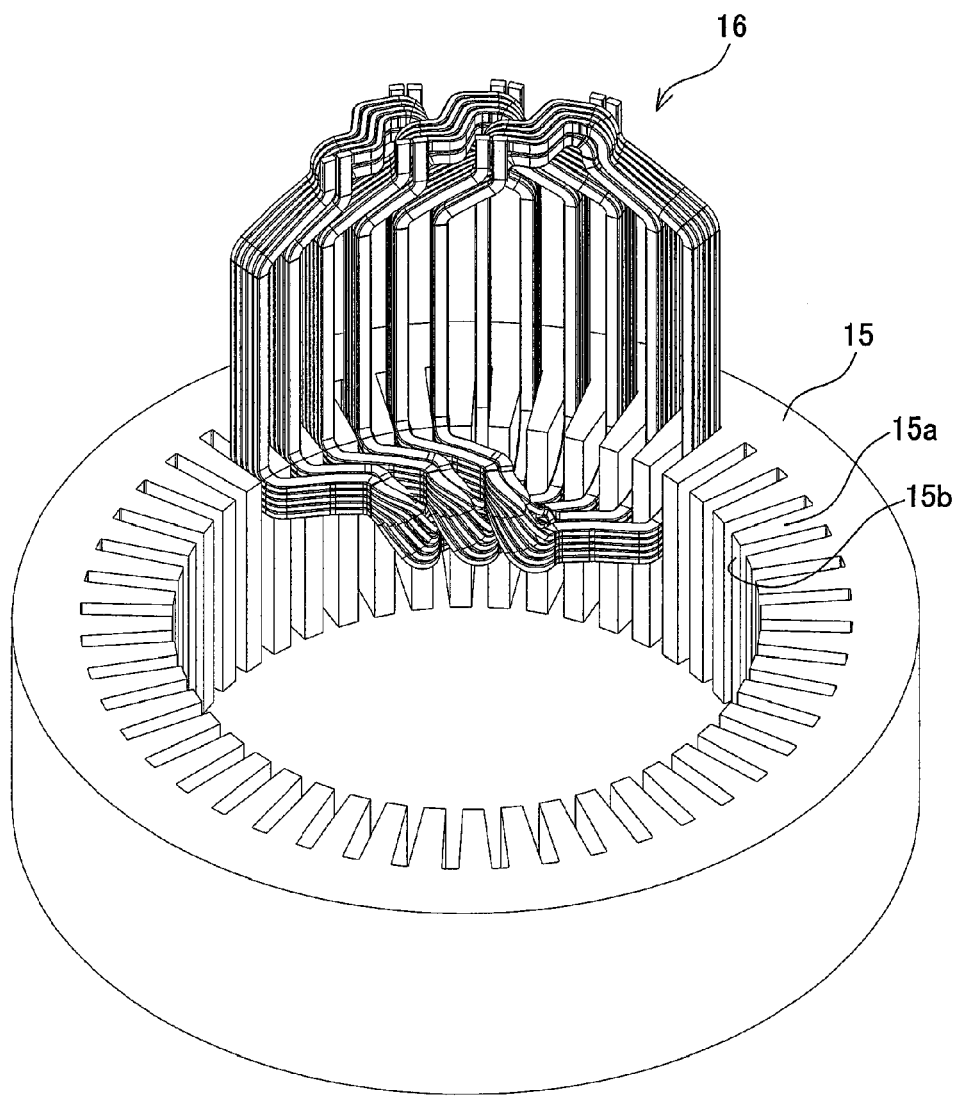
FIG. 25 is a first view showing an inserting step of inserting a part of the cage coil in a stator core.

Next, a method of inserting the cage coil 14 in the stator core 15 will be explained. FIGS. 24 and 25 show that a lower part of the cage coil 14 is inserted by about half into the stator core 15. Since it may be difficult to understand if the entire cage coil 14 is illustrated, FIG. 25 shows only the assembly 16 (the same shown in FIG. 23) consisting of the double base units 13U, 13V, and 13W for three U, V, and W phases, which is a part of the cage coil 14. Although the following explanation is given to an inserting operation of the assembly 16 which is a part of the cage coil 14 is explained, the same inserting operation also applies to the entire cage coil 14. Even though the insulator is not illustrated, it is preferable to mount the insulator in each slot S of the stator core 15 before the cage coil 14 is inserted.

As shown in FIG. 25, the semicircular portions 11(U1)H, 12(U1)H, 11(V1)H, 12 (V1)H, 11(W1)H, 12(W1)H, the horizontal portions 11(U1)FB, 12(U1)FB, 11(V1)FB, 12(V1)FB, 11(W1)FB, and 12(W1)FB, and the horizontal portions 11(U1)FA, 12(U1)FA, 11(V1)FA, 12(V1)FA, 11(W1)FA, and 12(W1)FA of the U-phase first outer base unit 11(U1), the U-phase first inner base unit 12(U1), the V-phase first outer base unit 11(V1), the V-phase first inner base unit 12(V1), the W-phase first outer base unit 11(W1), and the W-phase first inner base unit 12(W1) are located further toward the central line of the stator 10 than the inner peripheral surface 15b of each tooth 15a of the stator core 15.

When the in-slot conductor portions 11(U1)SA, 12(U1)SA, 11(V1)SA, 12(V1)SA, 11(W1)SA, 12(W1)SA, and the in-slot conductor portions 11(U1)SB, 12(U1)SB, 11(V1)SB, 12(V1)SB, 11(W1)SB, and 12(W1)SB of the U-phase first outer base unit 11(U1), the U-phase first inner base unit 12(U1), the V-phase first outer base unit 11(V1), the V-phase first inner base unit 12(V1), the W-phase first outer base unit 11(W1), and the W-phase first inner base unit 12(W1) are to be inserted from above in FIG. 25 to face down in the central axis direction of the stator core 15, the semicircular portions H, the horizontal portions FB, and the horizontal portions FA do not interfere with the stator core 15. Thus, the cage coil 14 can be inserted in the slots S of the stator core 15.

Herein, for example, five in-slot conductor portions 11(U1)SB (SB1 to SB5) of the U-phase first outer base unit 11(U1) are inserted on the inner periphery side of the U-phase first slot SU1 of the first group block B1. The other-side in-slot conductor portions 11(U1)SA (SA1 to SA5) are inserted on the outer periphery side of the U-phase second slot SU2 of the second group block B2.

On the inner periphery side of the U-phase first slot SU1 of the first group block B1, five in-slot conductor portion 12(U8)SB (SB1 to SB5) of the U-phase inner base unit 12(U8) of the eighth block not shown are inserted. Accordingly, in the U-phase first slot SU1 of the first group block B1, a total of ten flat conductor wires, i.e., the in-slot conductor portions 11(U1)SA and the in-slot conductor portions 12(U8)SB, are inserted.

Similarly, on the inner periphery side of the U-phase second slot SU2 of the second group block B2, five in-slot conductor portions 12(U2)SB (SB1 to SB5) of the U-phase inner base unit 12(U2) of the second group block not shown are inserted. Accordingly, in the U-phase second slot SU2, of the second group block B2, a total of ten flat conductor wires, i.e., the in-slot conductor portions 11(U1)SA (SA1 to SA5) and the in-slot conductor portions 12(U2)SB (SB1 to SB5) are inserted.

Figure 26:
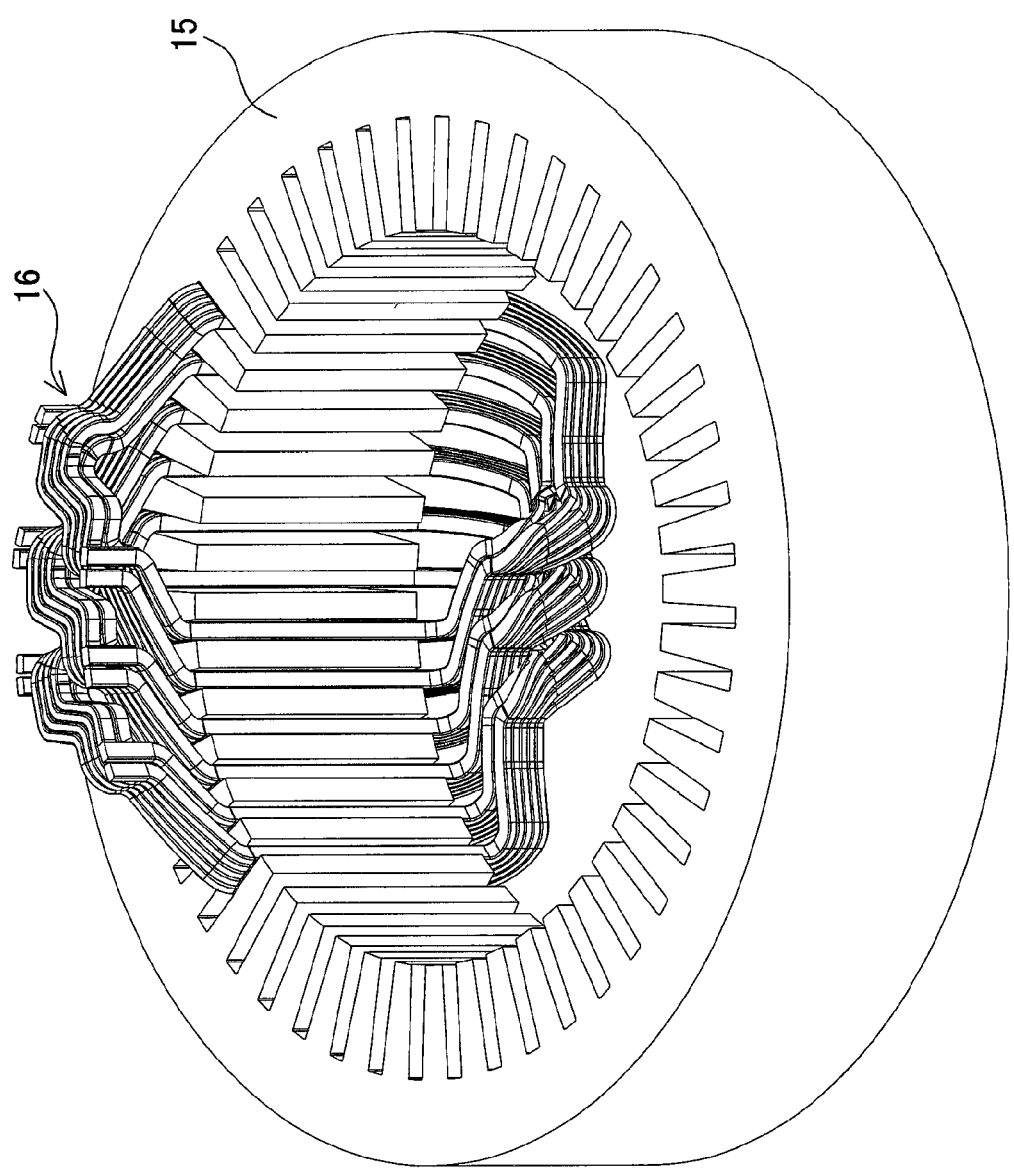
FIG. 26 is a second view showing the inserting step of inserting the part of the cage coil in the stator core.
Figure 28:
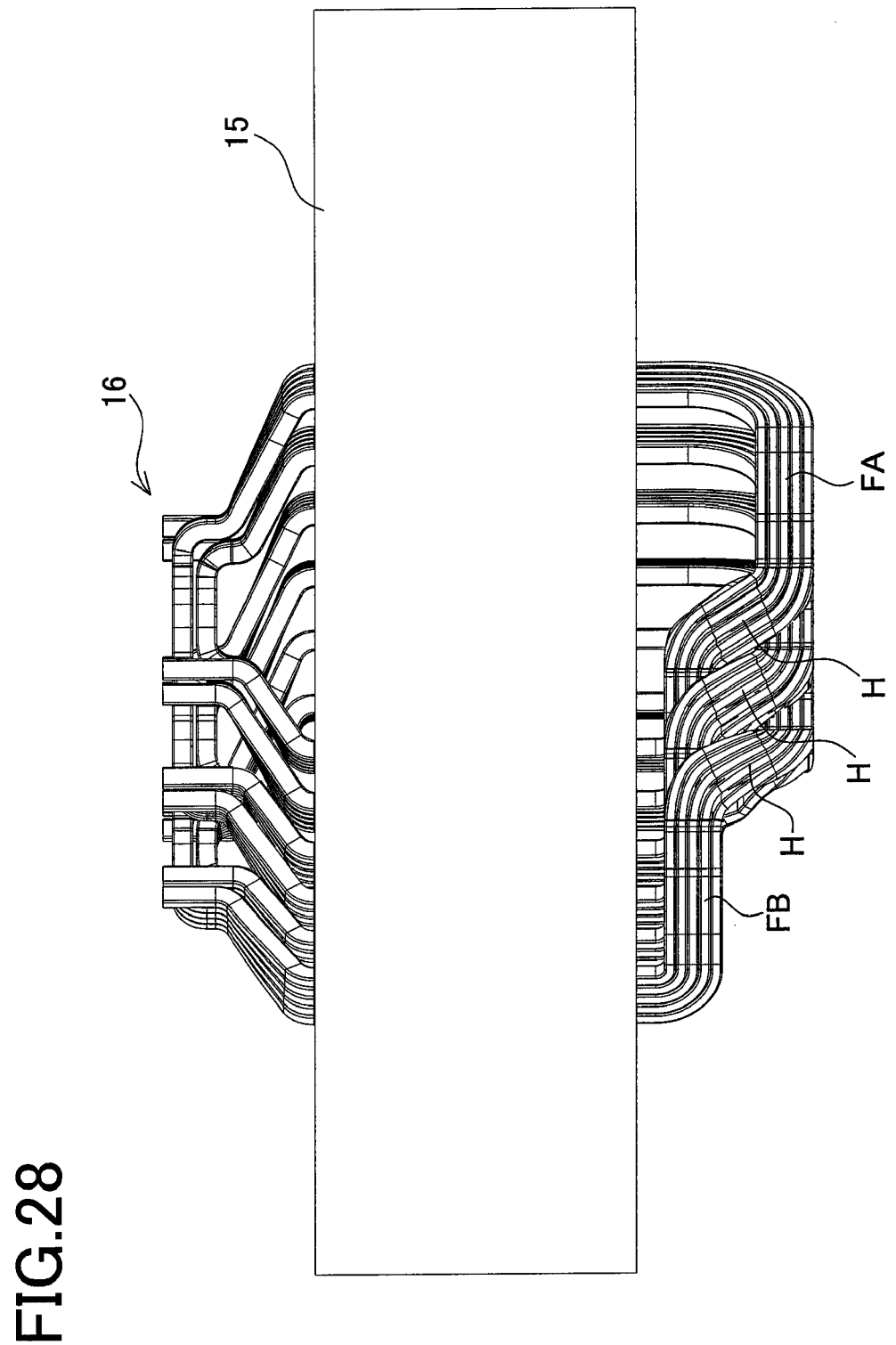
FIG. 28 is a fourth view showing the inserting step of inserting the part of the cage coil in the stator core.

FIG. 26 shows a state where the cage coil 14 is inserted to a predetermined position with respect to the stator core 15. FIG. 27 is a plan view of the stator core 15 of FIG. 26, seen from above in the axis. FIG. 28 is a front view of FIG. 26.

As shown in FIG. 28, the reason why the positions of the semicircular portions H, the horizontal portions F13, and the horizontal portions FA are spaced from the end face of the stator core 15 is to prevent the cage coil 14 from affecting the rotor.

When the cage coil 14 is inserted as in the state illustrated in FIG. 26, even though FIG. 26 showing only a part of the cage coil 14, assembling of the cage coil 14 to the stator core 15 is finished. Thereafter, a resin having high heat transfer performance is molded in the space in the slots S in which the in-slot conductor portions SA and SB have been inserted. Further, the terminals M and N are connected in sequence in each of the U phase, the V phase, and the W phase. Thus, the stator 10 is completed.

A method of mounting a rotor 42 of a motor in the completed stator 10 will be explained below.

Figure 29:
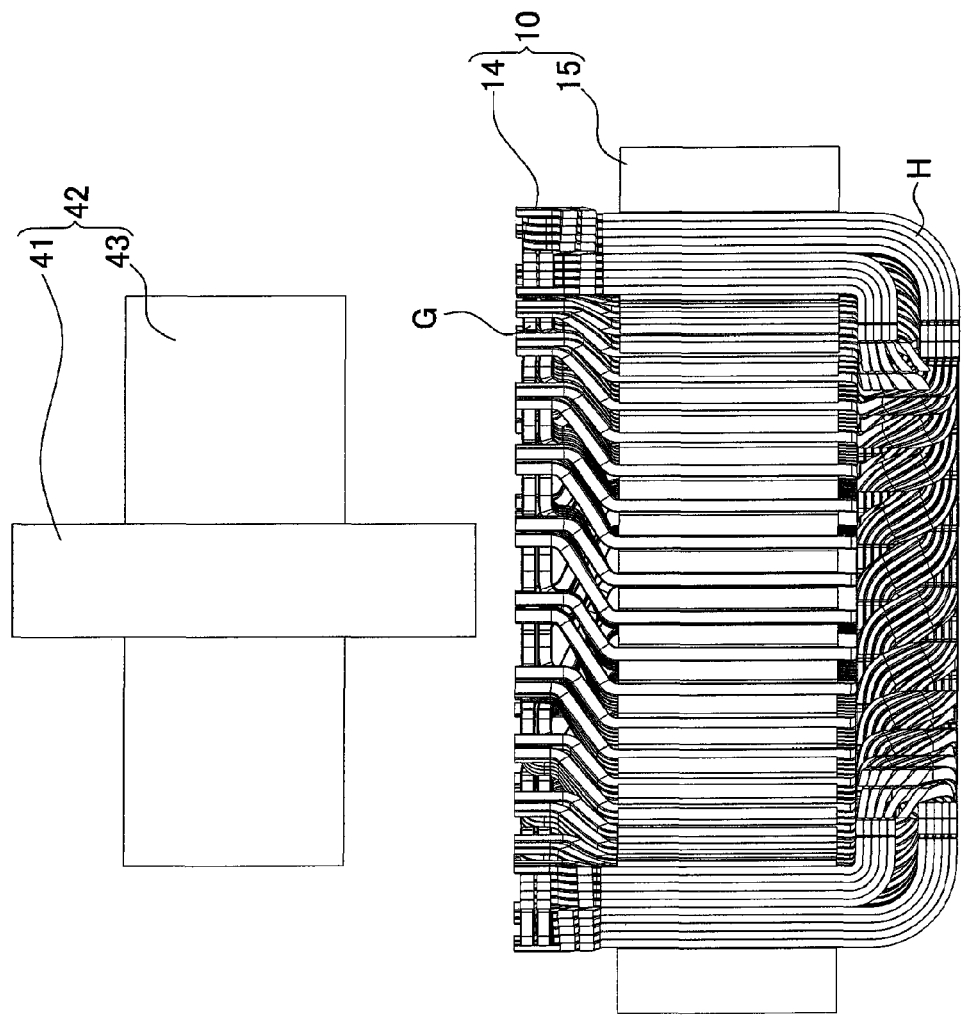
FIG. 29 is a first view showing an inserting step of inserting a rotor in a stator.

FIG. 29 is a cross-sectional view of the stator 10 taken along a central axis, in which the cage coil 14 is assembled with the stator core 15. In this state, on the upper side of the stator 10 in FIG. 29, the cage coil 14 is not exist in a further inward position than the inner peripheral surfaces 15b of the teeth 15a. On the other hand, on the lower side of the stator 10 in FIG. 29, the semicircular portions H the horizontal portions FA, and the horizontal portions FB, which are the bent portions of the cage coil 14, are located in a further inward position than the inner peripheral surfaces 15b of the teeth 15a.

The motor rotor 42 is formed with a rotor part 43 around a center shaft 41.

Figure 30:
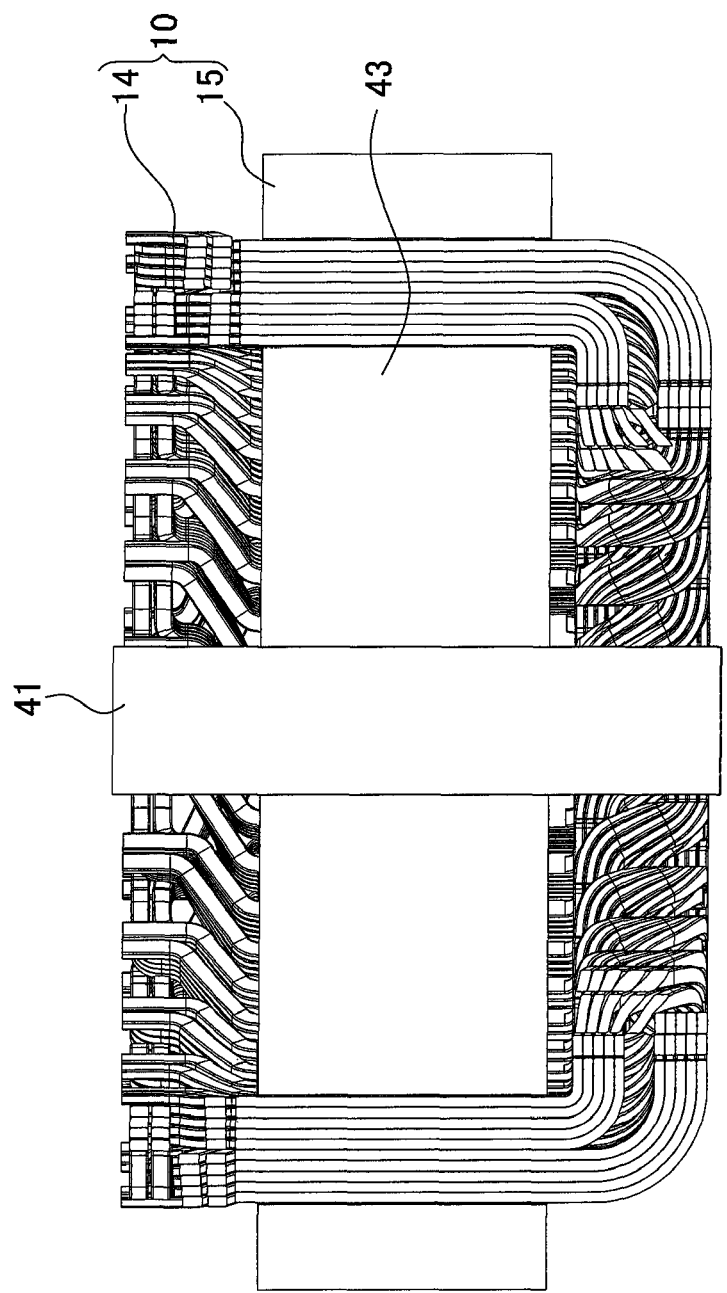
FIG. 30 is a second view showing the inserting step of inserting the rotor in the stator.

The rotor 42 can be inserted into the stator 10 axially from above, but cannot be inserted into the stator 10 from below. FIG. 30 shows a state where the rotor 42 is inserted in the stator 10.

As shown in FIG. 30, the center shaft 41 of the rotor 42 protrudes from a center hole defined by inner peripheral surfaces of the semicircular portions H of the cage coil 14.

Figure 31:
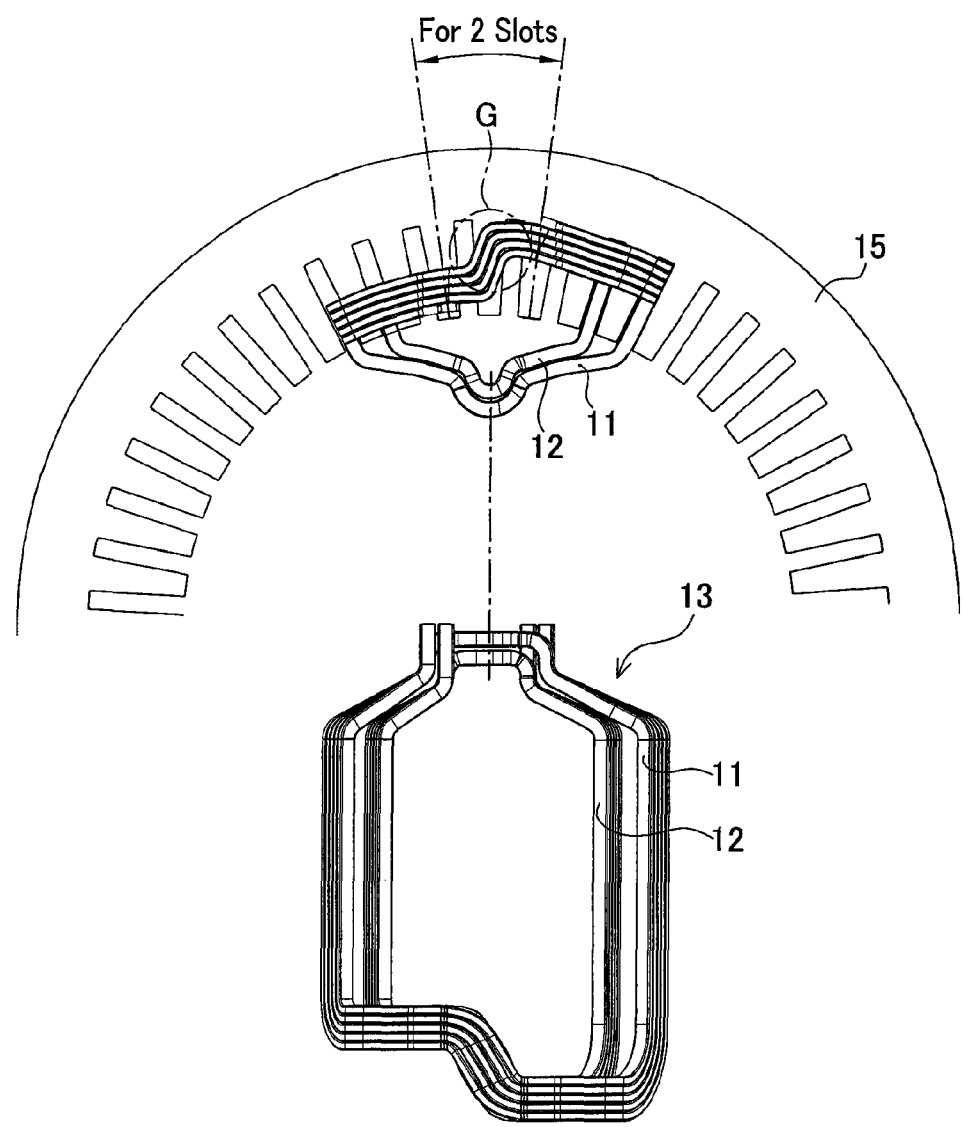
FIG. 31 is a view showing a positional relationship between the double base unit and a stator core.

On the other hand, as shown in FIG. 31, when the double base units 13 are inserted in the stator core 15, the lane change portions G of the outer base units 11 and the inner base units 12 each occupy an angle corresponding to two slots.

A "two-slot region" described herein represents the width of two slots and two teeth assuming that one slot and one tooth are defined as a one-slot region.

The present embodiment adopts a double coil, so that this lane change portion can use a double, two-slot region. This is suitable for a flat conductor wire which preferably has as wide a width as possible in relation to the bending radius. That is, increasing the cross sectional area of a flat conductor wire is effective in enhancing the space factor. As the cross sectional area is larger, the bending radius is also relatively larger.

According to the present embodiment, therefore, a stator with high space factor can be provided.

As explained above in details, according to the motor of the present embodiment, the stator 10 includes the cage coil 14 formed of the flat conductor wire in a distributed winding arrangement and the stator core 15 formed with the slots between the teeth, and the rotor 42 having the central axis. In this stator 10, (a) group blocks B each including the U-phase first slot SU1, U-phase second slot SU2, V-phase first slot SV1, V-phase second slot SV2, W-phase first slot SW1, and W-phase second slot SW2 are sequentially formed so that the second group block B2 is located adjacent to the first group block B1. (b) The flat conductor wires in the U-phase first slot SU1 of the first group block B1 and the flat conductor wires in the U-phase second slot SU2 of the second group block B2 form the outer base unit 11 (a first loop). (c) The flat conductor wires in the U-phase second slot SU2 of the first group block B1 and the flat conductor wires in the U-phase first slot SU1 of the second group block B1 form the inner base unit 12 (a second loop). (d) The inner base unit 12 is located inside of the outer base unit 11. (e) The coil end portion at one end of the inner base unit 12 and the coil end portion A at one end of the outer base unit 11 are bent toward the rotor 42 side with respect to the in-slot conductor portions SA and SB of the stator core 15. (f) The coil end portion A side at one end of the inner base unit 12 and the coil end portion A side at one end of the outer base unit 11 are located further toward the axis of the rotor 42 than the inner peripheral surface of the stator core 15. Accordingly, when the cage coil 14 is to be inserted with its coil end portion A at one end directing as a leading end into the slots of the stator core 15, the coil end portion A side at one end passes through the more inner side than the inner peripheral surface of the stator core 15 and therefore the coil can be easily inserted in the slots along the axial direction. Since the coil is not elastically deformed when it is inserted, a part of the coil is less likely to protrude out of the slots due to spring back.

Since the flat conductor wire is shaped into the double coil including the outer base unit 11 and the inner base unit 12, spaces for the lane change portions G can be ensured.

When a coil formed of the flat conductor wire in a loop shape is to be inserted the stator core 15, the wires are arranged in planar form on the end face of the stator core 15. In this case, since the end face of the stator core 15 has a restricted area, it is difficult to increase the number of wires to increase the number of turns of the coil. In the case of configuring the coil in a distributed winding form, the concentrically wound coils interfere with each other, and therefore the lane change portions G are needed in the coil end portion. In the lane change portions G, the coil width is apt to become an issue.

As shown in the present embodiment, according to the double coil configured such that the inner base unit 12 is formed on the inner circumferential side of the outer base unit 11, the end face of the stator core can be utilized in three dimensions. As a result, the number of turns of a coil can be increased. Even in the case where the number of turns in increased, it is also possible to prevent interference between adjacent coils with each other in the lane change portions G.

The double coil is formed by combining the outer base unit 11 and the inner base unit 12 in an overlapping configuration. Thus, the stator core 15 with deep slots can be adopted without so increasing the thickness of the coil end. Consequently, the demands for enhancement of the space factor of the stator and for reduction of size thereof can be satisfied.

On the other hand, the lane change portions G are necessary when a coil is concentrically wound and a stator is arranged in a distributed winding form. This is because if the concentrically wound coils are inserted by straddling or skipping two or more slots, an interference portion occurs between the adjacent coils and thus it is necessary to avoid such an interference portion. The present embodiment adopts the double coil (the outer base unit 11 and the inner base unit 12) and therefore each lane change portion G can use a two-slot range as shown in FIG. 27. Preferably, the flat conductor wire is designed to have as wide a width as possible because of the bending radius.

This is because increasing the cross-sectional area of a flat conductor wire is effective in enhancing the space factor. As the cross-sectional area is larger, the bending radius is also relatively larger. Thus, the present embodiment can provide the stator with high space factor.

Further, the outer base unit 11 and the inner base unit 12 are each formed as a base unit formed by bending a predetermined number of flat conductor wires at the same time. Accordingly, the wires wound in overlapping form (a base unit) are bent at the same time as being held in such an overlapping wound form. This can simplify the manufacturing process and reduce its cost.

Further, on the coil end portion A at one end, the flat conductor wires of each of the outer base unit 11 and the inner base unit 12 overlap in the axis direction of the rotor 42. On the coil end portion B at the other end, the flat conductor wires of each of the outer base unit 11 and the inner base unit 12 overlap in the radial direction of the rotor 42. Accordingly, on the coil end portion B at the other end in which the flat conductor wires overlap one another in the radial direction, the coil end can have a reduced size in the axial direction. Simultaneously, on the coil end portion A at one end in which the flat conductor wires overlap one another in the axial direction, the bent coil end can have a reduced size in the radial direction.

Moreover, the coil end portion A side at one end of the inner base unit 12 overlaps, outward in a radial direction of the rotor 42, on the coil end portion A side at one end of the outer base unit 11. The coil end portion B at the other end of the inner base unit 12 overlaps, inside in the axial direction of the rotor 42, with the coil end portion B side of the outer base unit 11. Accordingly, on the coil end portion B side at the other end, the units 11 and 12 overlap in the axial direction, thereby reducing the size in the radial direction. Simultaneously, on the coil end portion A side at one end, the units 11 and 12 overlap in the radial direction, thereby reducing the size in the axial direction.

In other words, on the coil end portion B side at the other end, the flat conductor wires of each of the outer base unit 11 and the inner base unit 12 overlap in the radial direction and also the base units overlap in the axial direction. Thus, the flat conductor wires can be collected up three-dimensionally. Thus, the volume of the coil end at the other end can be reduced.

Simultaneously, on the coil end portion A side at one end, the flat conductor wires of each of the outer base unit 11 and the inner base unit 12 overlap in the axial direction and also the base units overlap in the radial direction. This can collect up the flat conductor wires three-dimensionally. Thus, the volume of the coil end at the one end can be reduced.

In portions of the outer base unit 11 and the inner base unit 12 each forming the coil end portion A side at one end, the radius of the curved portion (the bent portions JA and JB) which is a connecting portion with one-side in-slot conductor portion is different by wires (turns) before the wires are bent.

After the wires of each base unit are bent simultaneously, the wires on the coil end portion A side at one end can overlap at the same radial position.

Before being bent, portions of the outer base unit 11 and the inner base unit 12 each forming the coil end at one end are displaced. After being bent, the wires of each of the outer base unit 11 and the inner base unit 12 overlap one another at the same radial position. The wires of each of the outer base unit 11 and the inner base unit 12 can be bent at the same time to overlap one another on the coil end portion A side at one end and coincide in the radial direction.

Although the coil end portion A side at one end and the coil end portion B side at the other end are not illustrated respectively, the signs A and B are added for convenience of understanding in the above embodiment.

It is to be noted that the motor of the invention and the manufacturing method of the motor are not limited to the above embodiment and may modified in other specific forms.

For instance, although the above embodiment exemplifies a motor with forty-eight slots S, the number of slots S may be changed.

INDUSTRIAL APPLICABILITY

The present invention is used in for example a motor of a hybrid electric vehicle.

DESCRIPTION OF THE REFERENCE SIGNS

10 Stator
11 Outer circumference base unit
12 Inner circumference base unit
13 Double base unit
14 Cage coil
15 Stator core
16 Assembly
41 Central axis
42 Rotor
43 Rotor part
11Un U-phase outer base unit of n-th group block
11Vn V-phase outer base unit of n-th group block
11Wn W-phase outer base unit of n-th group block
12Un U-phase inner base unit of n-th group block
12Vn V-phase inner base unit of n-th group block
12Wn W-phase inner base unit of n-th group block
G Raised portion
H Semicircular portion
SA, SB In-slot conductor portion
EA, EB Slant portion
FA, FB Horizontal portion
JA, JB Bent portion

The invention claimed is:

1. A motor including: a stator including a distributed winding coil formed of a flat conductor wire and a stator core formed with slots between teeth; and a rotor having a central axis,
wherein the slots are sequentially arranged by group blocks each including a U-phase first slot, a U-phase second slot, a V-phase first slot, a V-phase second slot, a W-phase first slot, and a W-phase second slot, a second group block being formed adjacent to a first group block, and the flat conductor wire in a U-phase first slot of the first group block and the flat conductor wire in a U-phase second slot of the second group block form a first loop,
the flat conductor wire in a U-phase second slot of the first group block and the flat conductor wire in a U-phase first slot of the second group block form a second loop,
the second loop is placed inside the first loop,
a coil end portion at one end of the second loop and a coil end portion at one end of the first loop are bent toward the rotor side with respect to in-slot conductor portions in the stator core, and
the coil end portion at the one end of the second loop and the coil end portion at the one end of the first loop are located further toward the axis of the rotor than an inner peripheral surface of the stator core,
the first loop and the second loop are each formed as a base unit including a predetermined number of flat conductor wires bent at the same time.

2. The motor according to claim 1, wherein
on the coil end portion at the one end, the flat conductor wires of each base unit overlap in the axis direction of the rotor, and
on the coil end portion at the other end, the flat conductor wires of each base unit overlap in the radial direction of the rotor.

3. The motor according to claim 2,
wherein, in portions of each base unit forming the coil end portion side at the one end, a radius of a curved portion which is a connecting portion with the in-slot conductor portion at one side is different by wires before the flat conductor wires are bent.

4. The motor according to claim 3,
wherein portions of each base unit forming the coil end portion at the one end are displaced before the flat conductor wires are bent, and the flat conductor wires of each base unit overlap one another at the same radial position when the flat conductor wires are bent.

5. The motor according to claim 2,
wherein portions of each base unit forming the coil end portion at the one end are displaced before the flat conductor wires are bent, and the flat conductor wires of each base unit overlap one another at the same radial position when the flat conductor wires are bent.

6. The motor according to claim 1,
wherein, in portions of each base unit forming the coil end portion side at the one end, a radius of a curved portion which is a connecting portion with the in-slot conductor portion at one side is different by wires before the flat conductor wires are bent.

7. The motor according to claim 6,
wherein portions of each base unit forming the coil end portion at the one end are displaced before the flat conductor wires are bent, and the flat conductor wires of each base unit overlap one another at the same radial position when the flat conductor wires are bent.

8. The motor according to claim 1,
wherein portions of each base unit forming the coil end portion at the one end are displaced before the flat conductor wires are bent, and the flat conductor wires of each base unit overlap one another at the same radial position when the flat conductor wires are bent.

* * * * *